(12) United States Patent
Miura et al.

(10) Patent No.: US 9,953,094 B2
(45) Date of Patent: Apr. 24, 2018

(54) MATCHING METHOD AND MATCHING PROGRAM FOR MATCHING OPERATIONAL INFORMATION OF USERS OF DEVICES

(71) Applicant: Panasonic Intellectual Property Corporation of America, Torrance, CA (US)

(72) Inventors: Kouji Miura, Osaka (JP); Aki Yoneda, Hyogo (JP); Shunji Harada, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 632 days.

(21) Appl. No.: 14/378,791

(22) PCT Filed: Dec. 16, 2013

(86) PCT No.: PCT/JP2013/007388
§ 371 (c)(1),
(2) Date: Aug. 14, 2014

(87) PCT Pub. No.: WO2014/097609
PCT Pub. Date: Jun. 26, 2014

(65) Prior Publication Data
US 2015/0026206 A1  Jan. 22, 2015

(30) Foreign Application Priority Data
Dec. 19, 2012  (JP) ................................. 2012-277319

(51) Int. Cl.
*G06F 17/30* (2006.01)
*H04N 21/24* (2011.01)
(Continued)

(52) U.S. Cl.
CPC ... *G06F 17/30876* (2013.01); *H04N 21/2407* (2013.01); *H04N 21/44204* (2013.01);
(Continued)

(58) Field of Classification Search
None
See application file for complete search history.

(56) References Cited

U.S. PATENT DOCUMENTS 8,392,435 B1 *  3/2013  Yamauchi .......... G06F 17/3064
                                                       707/749
2003/0046281 A1 *  3/2003  Son ................... G06F 17/30876
(Continued)

FOREIGN PATENT DOCUMENTS

JP  2002-49786   2/2002
JP  2002-358377  12/2002
(Continued)

OTHER PUBLICATIONS

International Search Report dated Mar. 11, 2014 in corresponding International Application No. PCT/JP2013/007388.

*Primary Examiner* — Christopher J Raab
(74) *Attorney, Agent, or Firm* — Wenderoth, Lind & Ponack, L.L.P.

(57) ABSTRACT

A matching method includes: accumulating log information indicating histories of operations performed on devices by users; receiving a request for information regarding use of a first device from an information requester being one of the users and using the first device; analyzing log information of the first device from among the log information accumulated in the accumulating; identifying, as an information provider candidate, at least one of the users using a second device by using the log information of the first device analyzed in the analyzing and log information of the second device being of the same type as the first device; notifying the information provider candidate of the request from the information
(Continued)

requester; and notifying the information requester of provided information which is information regarding use of the first device and provided by the information provider candidate in response to the request.

13 Claims, 25 Drawing Sheets

(51) Int. Cl.
  *H04N 21/442* (2011.01)
  *H04N 21/45* (2011.01)
  *H04N 21/466* (2011.01)
(52) U.S. Cl.
  CPC ... *H04N 21/44222* (2013.01); *H04N 21/4532* (2013.01); *H04N 21/4667* (2013.01)

(56) References Cited

U.S. PATENT DOCUMENTS

| | | | |
|---|---|---|---|
| 2004/0215708 A1* | 10/2004 | Higashi | G06F 21/10 709/201 |
| 2008/0086750 A1* | 4/2008 | Yasrebi | H04L 29/06027 725/86 |
| 2009/0265629 A1* | 10/2009 | Dantwala | H04N 1/00244 715/705 |
| 2011/0106911 A1* | 5/2011 | Sung | G06F 17/30029 709/217 |
| 2011/0193780 A1* | 8/2011 | Schaaf | G06F 1/1601 345/163 |
| 2012/0210215 A1* | 8/2012 | Chrabaszcz | G06F 9/4446 715/708 |
| 2013/0132178 A1 | 5/2013 | Masuko et al. | |
| 2013/0185320 A1* | 7/2013 | Iwasaki | G06F 17/2235 707/758 |

FOREIGN PATENT DOCUMENTS

| | | |
|---|---|---|
| JP | 2004-355386 | 12/2004 |
| JP | 2008-146455 | 6/2008 |
| JP | 4966150 | 7/2012 |
| JP | 2012-248071 | 12/2012 |

* cited by examiner

FIG. 3

| Date and time | Operation/state identifier | Operation/state data | Transmitted flag |
|---|---|---|---|
| 20121212090109 1107 | 00000001 | 0001 | 0 |
| 20121212090109 1200 | 10000001 | 18 | 0 |
| 20121212090111 1734 | 00000002 | 0001 | 0 |

FIG. 7

| State identifier | Operation identifier | Previous state identifier | Next state identifier |
|---|---|---|---|
| 0000 | 0000 | FFFF | 0001 |
| 0001 | 0001 | 0000 | 0002 |
| 0002 | 0005 | 0001 | 0003 |

FIG. 8

| State identifier | Operation identifier | Determination amount |
|---|---|---|
| 0069 | Null | 120 |
| Null | 0018 | 5 |
| Null | 0019 | 5 |

FIG. 9

| State identifier | Operation identifier | Determination amount |
|---|---|---|
| 00867 | Null | 10 |
| Null | 0078 | 5 |
| Null | 0079 | 5 |

| Question group ~1100 | Question ID ~1101 | Questioner ID ~1102 | Question date and time ~1103 | Question text ~1104 |
|---|---|---|---|---|
| 0001 | 00000001 | 00006794 | 20121212 | ... |
| 0001 | 00000002 | 00006843 | 20121212 | ... |
| 0002 | 00000003 | 00002372 | 20121212 | ... |

FIG. 10B

| Question group | Answer ID | Answerer ID | Answer date and time | Answer text |
|---|---|---|---|---|
| 00000001 | 10000001 | 10008367 | 20121212 | ... |
| 00000001 | 10000002 | 10009873 | 20121212 | ... |
| 00000001 | 10000003 | 10003156 | 20121212 | ... |
| 00000001 | 10000004 | 10003289 | 20121212 | ... |

1101, 1106, 1107, 1108, 1109

MATCHING METHOD AND MATCHING PROGRAM FOR MATCHING OPERATIONAL INFORMATION OF USERS OF DEVICES

TECHNICAL FIELD

The present invention relates to a matching method and a matching program.

BACKGROUND ART

In recent years, Internet-connectable devices such as televisions and recorders have become more and more common, and various services are provided to such devices (for example, Patent Literature (PTL) 1 and PTL 2).

Furthermore, a service of a bulletin board has been provided on the Internet. In such a service, for example, a user posts a question regarding operating a device such as a home appliance on the bulletin board to receive an answer from a person having knowledge of the home appliance.

CITATION LIST

Patent Literature

[PTL 1] Japanese Unexamined Patent Application No. 2002-358377
[PTL 2] Japanese Patent No. 4966150

SUMMARY OF INVENTION

Technical Problem

However, the services disclosed in PTLs 1 and 2 mentioned above can be used by a user who is experienced in operating a device to some extent, and it is difficult for a user who is inexperienced in operating a device to use such services.

Moreover, if the user who is inexperienced in operating a device wants an accurate answer to his/her question through an Internet bulletin board service, the model or product identification (ID) number of the device of the user and details of the operation asked in the question should be clearly indicated. Unfortunately, there is a problem that it is difficult for the user who is inexperienced in operating a device to clearly identify such information, and thus the inexperienced user cannot obtain an accurate answer.

The present invention has been conceived in order to solve the above problem. An object of the present invention is to provide a matching method and a matching program that enable a user to obtain appropriate information regarding use of a device, even if the user is inexperienced in operating the device.

Solution to Problem

To achieve the object, a matching method according to an aspect of the present invention includes: accumulating log information indicating histories of operations performed on devices by users; receiving a request for information regarding use of a first device from an information requester who is one of the users and uses the first device; analyzing log information of the first device from among the log information accumulated in the accumulating; identifying, as an information provider candidate, at least one of the users who uses a second device by using the log information of the first device analyzed in the analyzing and log information of the second device, the second device being of the same type as the first device; notifying the information provider candidate of the request from the information requester; and notifying the information requester of provided information which is information regarding use of the first device and provided by the information provider candidate in response to the request.

Each general or specific aspect of the present invention may be implemented using a system, a method, an integrated circuit, a computer program, or a computer-readable recording medium such as a CD-ROM, or any combination of a system, a method, an integrated circuit, a computer program, and a recording medium.

Advantageous Effects of Invention

A matching method according to the present invention enables a user to obtain appropriate information regarding use of a device, even if the user is inexperienced in operating the device.

BRIEF DESCRIPTION OF DRAWINGS

FIG. 3 shows an example of a data structure of log information accumulated in a log information accumulation unit,
FIG. 7 shows an example of a data structure of performance specifications stored in a device performance specification DB according to Embodiment,
FIG. 8 shows an example of a data structure of stuck states stored in a device use stuck DB according to Embodiment.
FIG. 9 shows an example of data indicating an advanced operation stored in an advance use DB according to Embodiment.
FIG. 10A shows an example of data stored in a BBS DB according to Embodiment.
FIG. 10B shows an example of data stored in the BBS DB according to Embodiment.

Figure 1A:
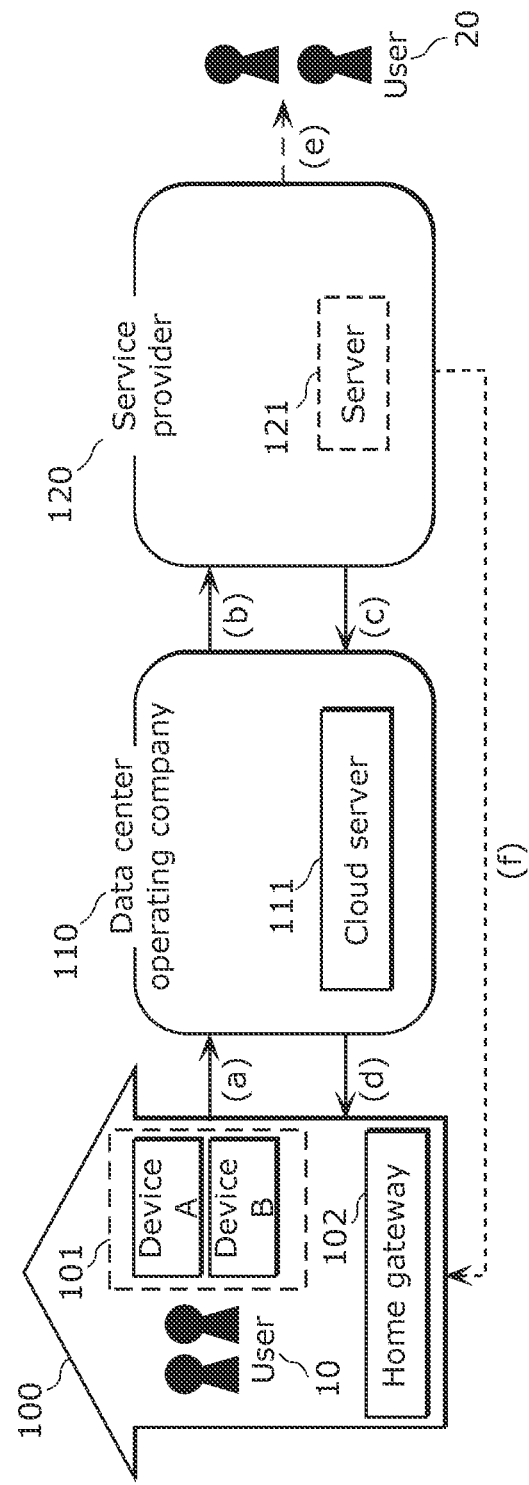
FIG. 1A illustrates an overall view of a matching system according to Embodiment.

DESCRIPTION OF EMBODIMENT (Circumstances Leading to an Aspect of the Present Invention)

Hereinafter, circumstances leading to an aspect of the present invention are described.

In recent years, Internet-connectable devices have become more and more common and variety of services are being available to such devices. Examples of such devices includes (i) audio visual (AV) home appliances such as televisions and recorders and (ii) home appliances called domestic electric appliances such as weight scales, activity monitors, rice cookers, ovens, and refrigerators. An example of the services that are being available to the Internet-connectable AV home appliances such as televisions and recorders is a service for distributing videos such as movies and sports videos. Moreover, a service using analyses of operational information and performance information of a home appliance has also become available.

For example, PTL 1 discloses a technique in which a server obtains a usage condition of a user via the Internet with respect to each function of a sold device, and a suggestion for an aggressive use according to the usage condition is provided to the user. Moreover, PTL 2 discloses a technique in which a server obtains usage conditions of home appliances and equipment in a house via the Internet, and recommended operations for the home appliances and equipment are exchanged among users having similar usage conditions of the home appliances and equipment.

Meanwhile, since home appliances have become more sophisticated, the number of operation buttons on a remote controller or a home appliance has been increased, as well as the number of information to be displayed on a display device such as a display screen. This leads to many problems, for example, a user is unable to use a home appliance because of not knowing how to operate the home appliance, and a user mistakenly operates a home appliance. Although operation manuals are accompanied with home appliances, many users do not read the manuals because those manuals have many pages and it is difficult to find a desired description.

Therefore, an Internet bulletin board service is provided which allows a user to ask a question regarding operating a home appliance and receive an answer from a person having knowledge of the home appliance. In such a bulletin board service, an accurate answer can be obtained by clearly identifying not only a model or a product ID, but also identifying which operation is related to the question, or what kind of operational steps has led to the question.

Unfortunately, a questioner asks a question regarding an operation because the questioner is inexperienced in operations, and thus it is difficult for the questioner to clearly identify such information. Moreover, even when an answer is obtained from an answerer, the questioner may not understand the answer. In such a case, the questioner needs to exchange messages with the answerer many times through the bulletin board to understand the answer.

Furthermore, the question asked by the questioner may be answered by a person (answerer) who has not actually operated the home appliance asked in the question. Thus, the answer may be unclear and inadequate, which may lead to a trouble between the questioner and the answerer.

The present invention has been conceived in view of the above problems, and an object of the present invention is to provide a matching method and a matching program that enable a user to obtain appropriate information regarding use of a device, even if the user is inexperienced in operating the device.

To achieve the object, a matching method according to an aspect of the present invention includes: accumulating log information indicating histories of operations performed on devices by users; receiving a request for information regarding use of a first device from an information requester who is one of the users and uses the first device; analyzing log information of the first device from among the log information accumulated in the accumulating; identifying, as an information provider candidate, at least one of the users who uses a second device by using the log information of the first device analyzed in the analyzing and log information of the second device, the second device being of the same type as the first device; notifying the information provider candidate of the request from the information requester; and notifying the information requester of provided information which is information regarding use of the first device and provided by the information provider candidate in response to the request.

In this way, the information requester and the information provider can be matched. Thus, even a user who is inexperienced in operating a device can obtain appropriate information regarding use of the device from the information provider.

Moreover, for example, in the identifying, the log information of the first device analyzed in the analyzing and the log information of the second device may be compared to identify the at least one of the users who uses the second device as the information provider candidate.

Here, for example, the log information may include (i) operational log information indicating a history of operations performed on the first device by the information requester and (ii) state log information indicating a history of states of the first device, the states being changed by the operations performed by the information requester.

Moreover, for example, in the analyzing, a plurality of operations performed on the first device by the information requester and a plurality of states of the first device changed by the operations may be identified by analyzing the operational log information and the state log information of the first device, and in the notifying of the request, the operations and the states identified in the analyzing may be notified together with the request from the information requester.

Moreover, for example, in the analyzing, a first operation performed on the first device by the information requester and a first state of the first device changed by the first operation may be identified by analyzing the operational log information and the state log information of the first device, and in the identifying, the log information of the first device analyzed and the log information of the second device may be compared to identify, as the information provider candidate, the at least one of the users who uses the second device having log information including the first operation and the first state identified in the analyzing.

Moreover, for example, the identifying may further include determining a stuck state in which the user is stuck in the operations of the first device based on the log information of the first device analyzed in the analyzing, in the analyzing, a plurality of operations performed on the first device by the information requester and a plurality of states of the first device changed by the operations may be identified by analyzing the operational log information and the state log information of the first device, and in the identifying, at least one of the users who uses the second device may be identified as an information provider candidate, the second device having log information including (i) a second operation performed in the stuck state determined in the determining of a stuck state, (ii) a state of the first device before the second operation is performed and the state of the first device changed by the second operation, and (iii) an operation performed temporally after the second operation.

In this way, the information requester can be matched with the information provider who has dealt with the stuck operation of the device, and thus even a user who is inexperienced in operating the device can obtain appropriate information regarding use of the device from the information provider.

Moreover, for example, the identifying may further include determining whether or not an advanced operation is performed on the second device based on the log information of the first device analyzed in the analyzing, in the analyzing, a plurality of operations performed on the first device by the information requester and a plurality of states of the first device changed by the operations may be identified by analyzing the operational log information and the state log information of the first device, and in the identifying, when the advanced operation determined in the determining of an advanced operation is not included in the operations performed on the first device by the information requester, at least one of the users who uses the second device having operational log information including the advanced operation determined may be identified as an information provider candidate.

In this way, the information requester is matched with an information provider who performs an advanced operation on the device. Even a user who does not know the existence or use of the advanced operation of the device can obtain appropriate information regarding use of the device from the information provider.

Here, for example, the advanced operation may be an operation performed at a frequency less than or equal to a predetermined frequency among a plurality of operations to be performed on the first device and the second device.

Moreover, for example, the advanced operation may be an operation which is to be performed on the first device and the second device and that is newly set as an operation other than a plurality of predetermined operations.

Moreover, for example, the provided information may include, as information regarding use of the first device, device setting information which is information regarding a setting of the first device.

With this, device setting information of the information provider is provided to the information requester, and thus the information requester can easily set up the device using the provided device setting information.

Moreover, for example, the provided information may include, as information regarding use of the first device, device operational information that includes an operational procedure of the first device.

With this, the device operational information of the information provider is provided to the information requester, and thus the information requester can perform the same device operation as the information provider has performed.

Each general or specific aspect of the present invention may be implemented using a system, a method, an integrated circuit, a computer program, or a computer-readable recording medium such as a CD-ROM, or any combination of a system, a method, an integrated circuit, a computer program, and a recording medium.

The following describes in detail a matching method according to an aspect of the present invention with reference to the accompanying drawings.

Note that each embodiment described below shows a specific example of the present invention. The values, materials, structural components, layout and connection of the structural components, steps, and the order of the steps in the embodiment are mere examples, and are not intended to limit the scope of the present invention. Therefore, among the structural components in the following exemplary embodiment, structural components not recited in any one of the independent claims which indicate the broadest concepts of the present invention are described as optional structural components. Each of the exemplary embodiments may be combined, (Overall View of Service to be Provided)

Figure 1B:
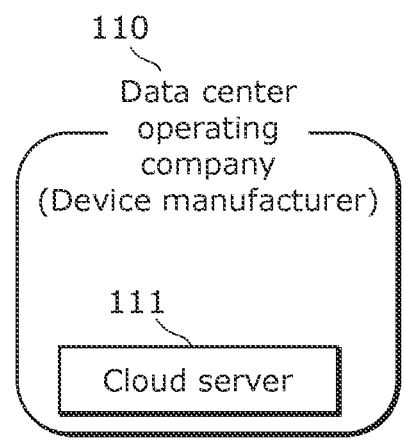
FIG. 1B illustrates a modification of a part of a configuration of an information providing system according to Embodiment.
Figure 1C:
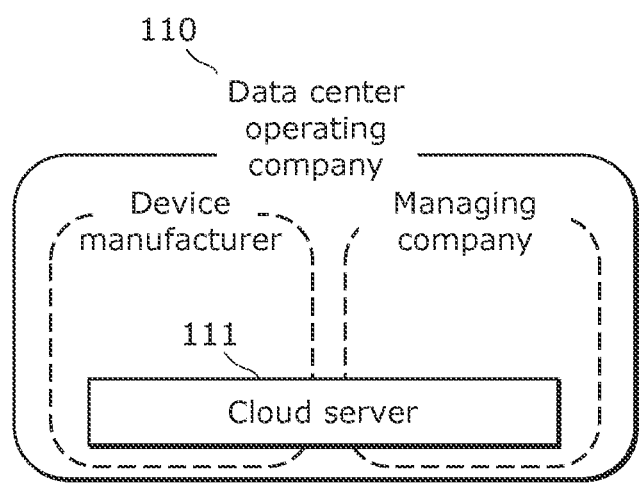
FIG. 1C illustrates a modification of a part of the configuration of the information providing system according to Embodiment.

FIG. 1A illustrates an overall view of a matching system according to Embodiment. FIG. 1B illustrates a modification of a part of a configuration of an information providing system according to Embodiment, and FIG. 1C illustrates a modification of a part of the configuration of the information providing system according to Embodiment.

A group 100 is, for example, a company, a party, and a home. The size of the group 100 does not matter. The group 100 includes a plurality of devices 101 including a device A and a device B, and a home gateway 102. The devices 101 include an Internet-connectable device (for example, a smartphone, a personal computer (PC), and a television (TV)); and a device that is unconnectable to the Internet by itself (for example, lighting equipment, a washing machine, and a refrigerator). Even if a device is unconnectable to the Internet by itself, the device may be connectable to the Internet via the home gateway 102a. The group 100 includes a user 10 who uses the devices 101.

A data center operating company 110 includes a cloud server 111. The cloud server 111 is a virtual server which works with a variety of devices via the Internet. The cloud server 111 mainly manages large volumes of data (big data) which are difficult to manage with a usual database management tool or the like. The data center operating company 110 performs operations such as managing data and the cloud server 111, and operating a data center that manages data and the cloud server 111. Details of the operations performed by the data center operating company 110 are described later.

It should be noted that the data center operating company 110 is not limited to a company that performs only the above operations such as managing data and operating the cloud server 111. For example, when a device manufacturer that develops and manufactures one of the devices 101 also performs management and the like of data and the cloud server 111, the device manufacturer corresponds to the data center operating company 110 (FIG. 1B). Moreover, the data center operating company 110 is not limited to one company. For example, when the device manufacturer and another managing company cooperate on or share management of data and operation of the cloud server 111, both or one of the device manufacturer and the managing company corresponds to the data center operating company 110 (FIG. 1C).

A service provider 120 has a server 121. Example of the server 121 referred here includes a memory in a PC and the like, and the size of the server 121 does not matter. Moreover, the service provider sometimes does not have the server 121.

It should be noted that the home gateway 102 is optional in the above service. For example, when the cloud server 111 performs all the data management and so on, the home gateway 102 is unnecessary. Furthermore, there may be no device that is unconnectable to the Internet by itself as in the case where all devices in a home are connected to the Internet.

Next, a flow of log information (operation history information and performance history information) of a device in the aforementioned service is described.

First, the device A or the device B in the group 100 transmits its log information to the cloud server 111 of the data center operating company 110. The cloud server 111 accumulates the log information of the device A or the device B ((a) in FIG. 1A). Here, the log information is information indicating a working state, performance date and time, and so on of the devices 101. Examples of the log information include (i) a viewing history of a television and recording reservation information of a recorder, (ii) working date and time of a washing machine and an amount of laundry, and (iii) opening and closing date and time, and opening and closing frequency of a refrigerator. The log information is not limited to the above, and may be any information that can be obtained from any device. The log information may be provided to the cloud server 111 directly from the devices 101 themselves via the Internet. Moreover, the log information may be temporarily accumulated to the home gateway 102 from the devices 101, and provided to the cloud server 111 from the home gateway 102.

Next, the cloud server 111 of the data center operating company 110 provides the accumulated log information on a certain unit basis to the service provider 120. Here, the certain unit may be a unit for which the data center operating company can organize the accumulated information and provide the information to the service provider 120, or a unit which is requested by the service provider 120. The certain unit is not required to be constant, and the amount of information to be provided may vary depending on circumstances. The log information is stored in the server 121 of the service provider 120 as necessary ((b) in FIG. 1A).

After that, the service provider 120 organizes the log information to make the log information suitable to a service to be provided to a user, and provides the information to the user.

Here, the user receiving the information may be the user 10 who uses the devices 101 or an external user 20. The service may be provided to a user, for example, by providing information directly from the service provider ((b) and (e) in FIG. 1A). The service may also be provided to a user, for example, by returning the information back to the cloud server 111 of the data center operating company 110 to provide the information via the cloud server 111 ((c) and (d) in FIG. 1A). Moreover, the cloud server 111 of the data center operating company 110 may organize the log information to make the log information suitable to a service provided to a user, and provide the information to the service provider 120.

It should be noted that the user 10 and the user 20 may be the same user or different users.

Embodiment

Figure 2:
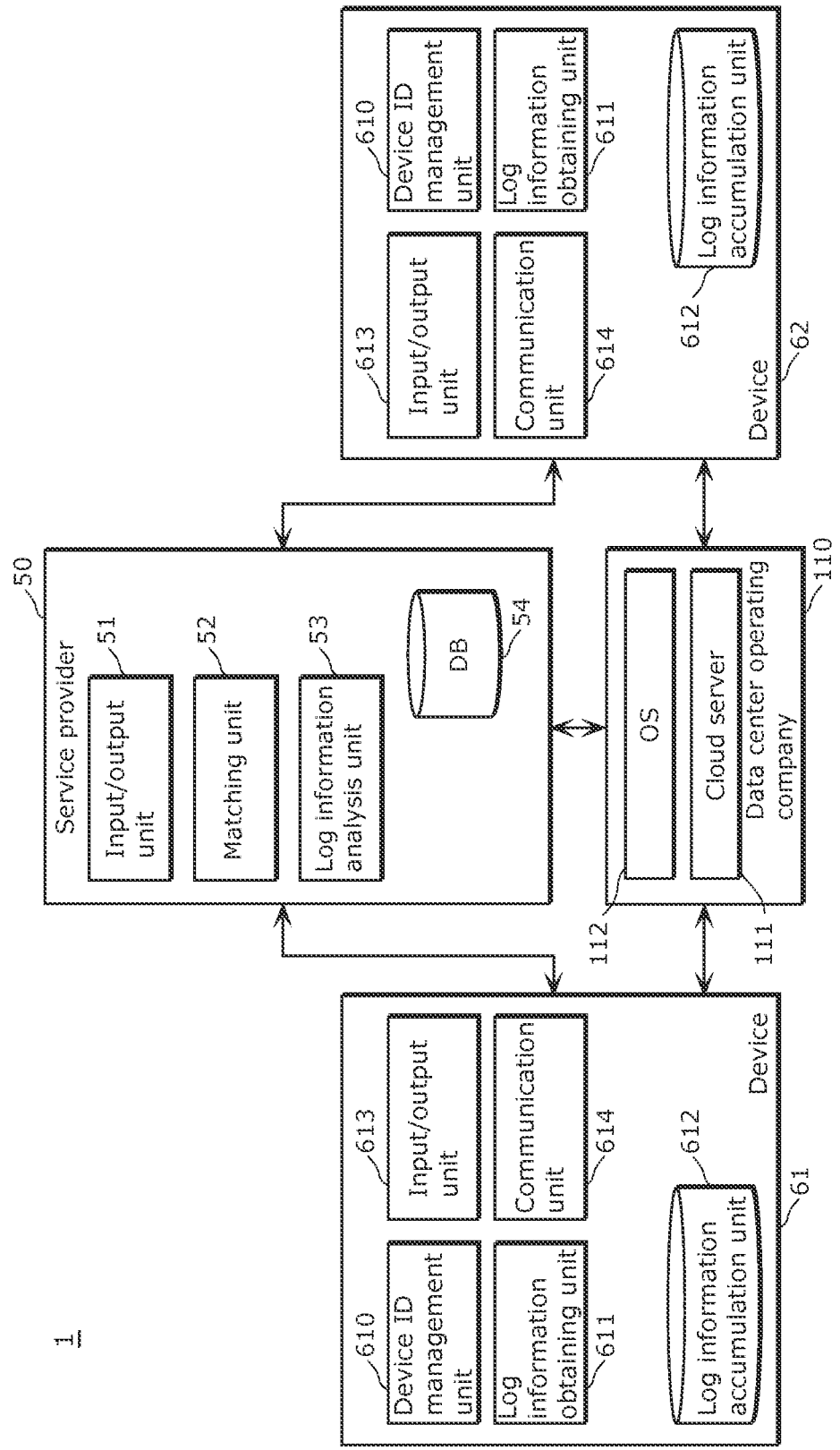
FIG. 2 is a block diagram illustrating a configuration of a matching system according to Embodiment.

FIG. 2 is a block diagram illustrating a configuration of a matching system according to Embodiment.

[Configuration of Matching System]

A matching system 1 illustrated in FIG. 2 includes a service provider 50, a device 61, a device 62, and the data center operating company 110. Here, the device 61 is one of the devices 101 belonging to the group 100 mentioned above, and the device 62 is one of the devices 101 belonging to the same group 100 or a different group. The service provider 50 is an example of the service provider 120.

[Structure of Device]

Hereinafter, the device 61 is described.

As illustrated in FIG. 2, the device 61 includes a device ID management unit 610, a log information obtaining unit 611, a log information accumulation unit 612, an input/output unit 613, and a communication unit 614. The device 61 is an example of a first device, and the device 61 is a domestic electric appliance used for housework, such as a home appliance, a weight scale, an activity monitor, a rice cooker, an oven, and a refrigerator, for example. The device 61 may be an AV home appliance such as a television and a recorder.

The device ID management unit 610 is a nonvolatile memory that stores a unique identifier for individually identifying the device 61. Examples of the device ID management unit 610 include a flash memory and a hard disk drive (HDD).

The log information obtaining unit 611 obtains log information indicating a history of operations performed on the device 61 by a user. Here, the log information includes operational log information indicating the history of operations performed on the device 61 by the user, and state log information that indicates a history of the states changed by the operations on the device 61 by the user.

In Embodiment, the log information is information regarding operations performed on the device 61 by a user and performances of the device 61. For example, if the device 61 is a microwave, the log information includes information such as a code number of a button pressed by a user on the microwave, a function identifier corresponding to the function selected by the user, a heating time period of the microwave, and so on.

The log information obtaining unit 611 obtains log information indicating a history of operations performed by the user on the device 61. More specifically, the log information obtaining unit 611 obtains operational log information each time the user operates the device 61 and accumulates the operational log information in the log information accumulation unit 612. Furthermore, the log information obtaining unit 611 obtains state log information when an operation is performed for predetermined time intervals or a specific operation is performed, and accumulates the state log information in the log information accumulation unit 612.

The log information accumulation unit 612 accumulates the log information obtained by the log information obtaining unit 611. In Embodiment, the log information accumulation unit 612 is, for example, a nonvolatile memory, and accumulates the operational log information and the state log information obtained by the log information obtaining unit 611. The newly obtained log information may be accumulated separately from or together with past log information.

FIG. 3 shows an example of a data structure of log information accumulated in the log information accumulation unit.

The log information accumulation unit 612 stores date and time 700, an operation/state identifier 701, operation/state data 702, and a transmitted flag 703.

The date and time 700 is date and time at which the device 61 is operated, or date and time at which the state of the device 61 is changed. For example, the date and time 700 is data (2012121209010911107) obtained by concatenating year, month, and time. The operation/state identifier 701 indicates whether the operation/state data 702 indicates an operation performed on the device 61 or a state of the device 61, and also indicates types of the operation or the state. Examples of the operation/state identifier 701 include identifiers indicating an operation such as pressing a button on the device 61 (00000001) and opening and closing a door of the device 61 (00000002), and indicating a state such as an inside temperature (10000001) and power consumption of the device 61. The operation/state data 702 is a specific value indicating an operation performed on the device 61 or a state of the device 61. Examples of the specific value include a value of a pressed button identifier (0001), a value indicating opening and closing frequency of the door of the device 61 (0001), and a power consumption amount of the device 61. The transmitted flag 703 is an identifier that identifies whether or not the log information accumulated in the log information accumulation unit 612 is transmitted to the data center of the data center operating company 110. If the log information is transmitted, "1" is accumulated, and if the log information is not transmitted, "0" is accumulated.

The input/output unit 613 receives an input from a user who uses the device 61 and outputs the input to the service provider 50. More specifically, when the user who uses the device 61 inputs a request for information (question information) regarding use of the device 61 as an information requester, the input/output unit 613 outputs the request to the service provider 50. Moreover, the input/output unit 613 displays provided information (answer information) that is provided by the service provider 50.

In Embodiment, the input/output unit 613 is an input/output device that notifies, via the communication unit 614, the service provider 50 of the question information (information regarding use) prepared by the user of the device 61. Moreover, the input/output unit 613 displays the answer information (provided information) provided from the service provider 50 via the communication unit 614 in response to the question from the user. The input/output unit 613 may include, for example, a simple input device such as a question button, or a complex input device or a circuit such as a keyboard and an audio input device. Moreover, the input/output unit 613 may include, for example, a simple output device such as a light emitting diode (LED) that indicates a button to be pressed next, or a complex output device or a circuit such as a display or an audio output device. It should be noted that an example of a specific method of preparing the question information by the user of the device 61 is described later in detail, and thus the description thereof is omitted here.

The communication unit 614 communicates with the data center operating company 110 and the service provider 120 via a network such as the Internet. In Embodiment, the communication unit 614 transmits the following information to the data center operating company 110 and the service provider 120 via the network: a unique identifier stored in the device ID management unit 610, the log information obtained by the log information obtaining unit 611, the past log information accumulated in the log information accumulation unit 612, and the question information input from the input/output unit 613. Furthermore, the communication unit 614 receives information to be output to the input/output unit 613 from the service provider 120, such as the answer information. The communication unit 614 transmits the log information after performing mutual authentication (or mutual authentication and user authentication) with the cloud server 111. It should be noted that details of this process are described later. The log information to be transmitted to the cloud server 111 is not required to be information accumulated in the log information accumulation unit 612. The log information obtained by the log information obtaining unit may be transmitted via the communication unit 614 without being accumulated in the log information accumulation unit 612.

The device 62 illustrated in FIG. 2 includes, as with the device 61, the device ID management unit 610, the log information obtaining unit 611, the log information accumulation unit 612, the input/output unit 613, and the communication unit 614. The device 62 is an example of a second device which is a domestic electric appliance used for housework, such as a home appliance, a weight scale, an activity monitor, a rice cooker, an oven, and a refrigerator, for example. The device 62 may be an AV home appliance such as a television and a recorder. Each of the structural components of the device 62 is the same as the structural components of the device 61, and thus the description thereof is omitted.

In Embodiment, a description is given using an example of a matching system 1 including two devices, namely the device 61 and the device 62, to simplify the description. It should be noted that the matching system 1 usually includes two or more devices, and includes the device 61 and the device 62 among the two or more devices,

[Configuration of Data Center Operating Company]

Next, the data center operating company 110 is described.

The data center operating company 110 manages the cloud server 111 that serves as a data center, and an operating system (OS) 112 as illustrated in FIG. 2.

The cloud server 111 is a virtual server which works with a variety of devices via a network such as the Internet. The cloud server 111 mainly manages large volumes of data (big data) which are difficult to manage with a usual database management tool or the like. The OS 112 is system software which provides an abstracted hardware interface to application software.

In Embodiment, the cloud server 111 performs mutual authentication with the device 61, and then accumulates the log information of the device 61 received by the communication unit 614.

[Configuration of Service Provider]

Next, the service provider 50 is described.

The service provider 50 illustrated in FIG. 2 includes an input/output unit 51, a matching unit 52, a log information analysis unit 53, and a database (DB) 54. The service provider 50 may be implemented, for example, as a server, or may be implemented as a matching apparatus or a matching program.

Figure 4:
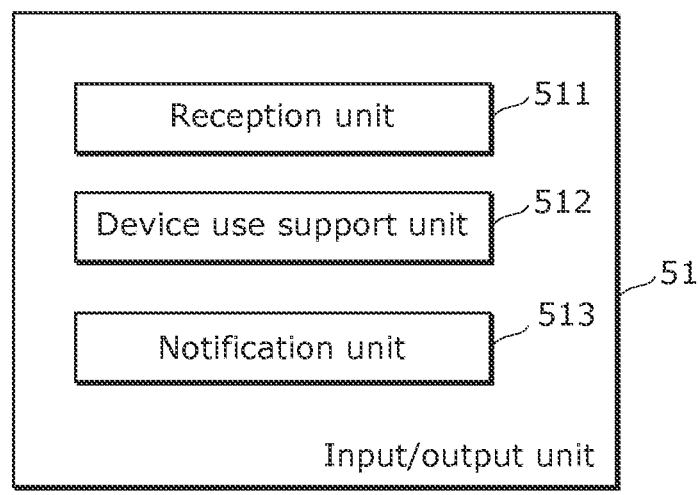
FIG. 4 illustrates detailed function blocks of the input/output unit illustrated in FIG. 2.
Figure 5:
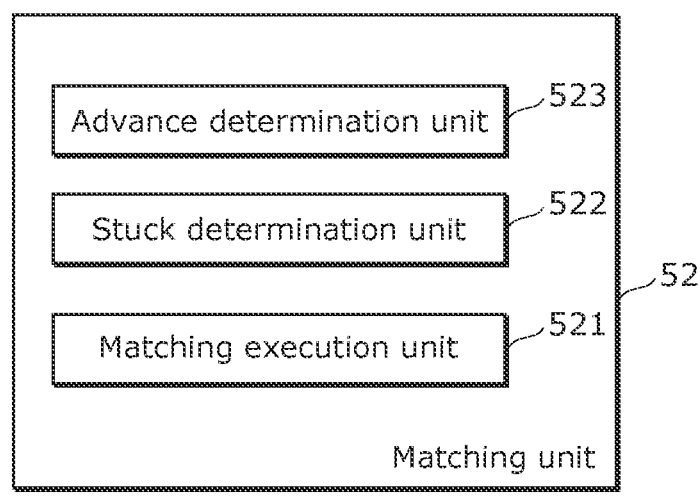
FIG. 5 illustrates detailed function blocks of the matching unit illustrated in FIG. 2.
Figure 6:
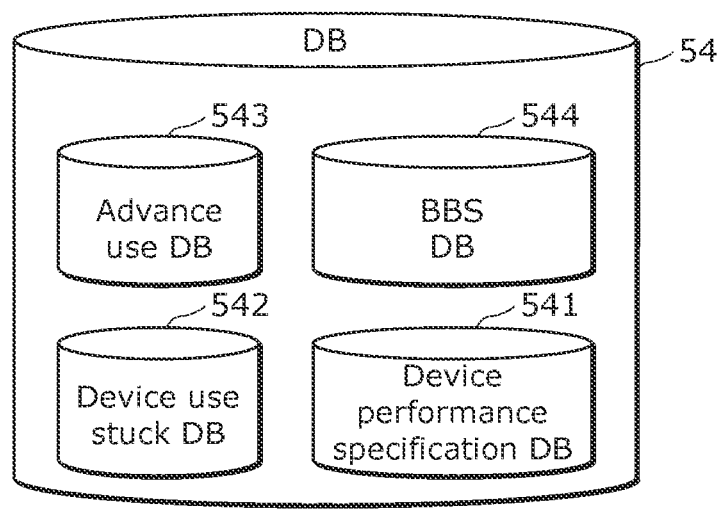
FIG. 6 illustrates detailed function blocks of the DB illustrated in FIG. 2.

FIG. 4 illustrates detailed function blocks of the input/output unit illustrated in FIG. 2. FIG. 5 illustrates detailed function blocks of the matching unit illustrated in FIG. 2. FIG. 6 illustrates detailed function blocks of the DB illustrated in FIG. 2. It should be noted that the elements same as the elements in FIG. 2 are indicated by the same reference numbers, and a detailed description thereof is omitted.

[Configuration of Input/Output Unit]

As illustrated in FIG. 4, the input/output unit 51 includes a reception unit 511, a device use support unit 512, and a notification unit 513. The input/output unit 51 communicates with the data center operating company 110, the device 61, and the device 62 via a network such as the Internet.

The reception unit 511 has a function of receiving a request for information regarding use of the device 61 from an information requester who is one of users and uses the device 61. Moreover, the reception unit 511 has a function of receiving provided information which is information regarding use of the device 61 and provided by an information provider candidate in response to the request regarding use of the device 61 from the information requester. It should be noted that the provided information may include, as information regarding use of the device 61, a device setting information which is information regarding a setting of the device 61, or device operational information that includes an operational procedure of the device 61.

In Embodiment, the reception unit 511 receives a request for information (question information or the like) regarding use of the device 61 from the user who uses the device 61 (information requester), and accumulates the content of the received request (content of the question). Moreover, the reception unit 511 receives information (provided information) prepared by an answerer (information provider candidate) as an answer to the question information.

The notification unit 513 has a function of notifying the information provider candidate of a request for information (question information or the like) regarding use of the device 61 from the information requester. Moreover, the notification unit 513 has a function of notifying the information requester of provided information which is information regarding use of the device 61 and provided by the information provider candidate in response to the request for the information (question information) regarding use of the device 61. It should be noted that when the notification unit 513 notifies of the above request (question information or the like), the notification unit 513 may notify of a plurality of operations and a plurality of states that are identified by the log information analysis unit 53 together with the request (question information or the like).

In Embodiment, the notification unit 513 notifies an information provider candidate (answerer candidate) matched by the matching unit 52 of content of a question from a questioner. Moreover, the notification unit 513 notifies the user who uses the device 61 and who is the questioner (information requester) of the information prepared by the information provider and received by the reception unit 511 (provided information). It should be noted that any method may be used to notify the information provider candidate and the questioner, for example, contacting by e-mail, push notification, visually notifying the questioner when the questioner uses the service, and the like.

The device use support unit 512 prepares support information for specifying content of the question from the questioner and support information for specifying content of the answer from the answerer. A specific example of the support information is described later, and thus the description thereof is omitted here.

[Structure of Log Information Analysis Unit]

The log information analysis unit 53 obtains log information corresponding to the device 61 and analyzes the log information of the device 61. More specifically, the log information analysis unit 53 identifies a plurality of operations performed on the device 61 by the information requester and a plurality of states of the device 61 changed by the operations by analyzing operational log information and state log information of the device 61. It should be noted that the log information analysis unit 53 may obtain the log information corresponding to the device 61 at the time when the input/output unit 51 receives a request from the information requester, or may periodically obtain log information from all devices including the device 61.

In Embodiment, the log information analysis unit 53 obtains log information corresponding to the device 61 and log information corresponding to the device 62 from among the log information accumulated in the cloud server 111 of the data center operating company, and analyzes the operational log information and the state log information of the device 61.

More specifically, the log information analysis unit 53 identifies the device type of the device 61 used by the user who is the questioner (information requester) and searches a device performance specification DB 541 to identify the log information of the device 61 from among the log information accumulated in the cloud server 111. In this way, the log information analysis unit 53 can obtain the log information of the device 61 from the cloud server 111. It should be noted that a specific example of the method of obtaining log information from the cloud server 111 is described later. Subsequently, the log information analysis unit 53 analyzes the log information that is obtained from the cloud server 111 and corresponds to the device 61, and identifies operations performed by the questioner.

[Structure of Matching Unit]

The matching unit 52 identifies, as an information provider candidate, at least one of the users who uses the device 62 by using the log information of the device 61 analyzed by the log information analysis unit 53 and the log information of the device 62 being of the same type as the device 61. More specifically, the matching unit 52 compares the log information of the device 61 analyzed by the log information analysis unit 53 and the log information of the device 62 to identify, as the information provider candidate, at least one of the users who uses the second device having log information including a first operation and a first state identified by the log information analysis unit 53. As described above, the matching unit 52 compares the log information of the device 61 which is analyzed by the log information analysis unit 53 with the log information of the device of the same type as the device 61 to identify, as the information provider candidate, at least one of the users (user of the device 62) who uses the device of the same type.

In Embodiment, the matching unit 52 includes a matching execution unit 521, a stuck determination unit 522, and an advance determination unit 523 as illustrated in FIG. 5.

The stuck determination unit 522 determines a stuck state in which the user gets stuck in the operations of the device 61 based on the log information of the device 61 analyzed by the log information analysis unit 53. In Embodiment, the stuck determination unit 522 determines the stuck operation for the user, for example, by determining whether the operation of the device 61 analyzed by the log information analysis unit 53 is included in a device use stuck DB 542. The details are described later and thus the description thereof is omitted here.

The advance determination unit 523 determines whether or not an advanced operation is performed on the device 62 based on the log information of the device 61 analyzed by the log information analysis unit 53. Here, the advanced operation may be an operation which is performed at a frequency less than or equal to a predetermined frequency from among a plurality of operations which can be performed on the devices 61 and 62, or may be an operation which is newly set as an operation other than predetermined operations which can be performed on the device 62. For example, if the device 61 is an oven, the advanced operation may be not just pressing a button of "Heating," but an operation of changing a finishing temperature. Similarly, the advanced operation may be not just pressing the button of "Heating," but an operation of using "Steam heating." Furthermore, the advanced operation may be an operation of changing the strength of the steam. Moreover, the advanced operation may be an operation of searching for a menu from cooking recipes or may be registering a favorite. Moreover, for example, if the device 61 is a washing machine, the advanced operation may be not just an operation of setting "Auto" function of the washing machine, but an operation set after changing the times for "Washing," "Rinsing," and "Spinning," which is an preference operation stored as "My original washing course" by a user. Moreover, the advanced operation may be an operation of cleaning using "Tub Cleaning" course.

The advance determination unit 523 determines whether or not an advanced operation is performed by a user by determining whether the device operation analyzed by the log information analysis unit 53 is included in an advance use DB 543. The details are described later and thus the description thereof is omitted here.

The matching execution unit 521 identifies, as an information provider candidate, at least one of the users who uses a device of the same type as the device 61 (user of the device 62), the device of the same type having log information including (i) a second operation performed in the stuck state determined in the determining of a stuck state by the stuck determination unit 522, and (ii) a state of the device 61 before the second operation is performed and the state of the device 61 changed by the second operation. Furthermore, when an advanced operation determined in the determining of an advance operation by the advance determination unit 523 is not included in the operations performed on the device 61 by the information requester, the matching execution unit 521 identifies at least one of the users who uses the second device having operational log information including the advanced operation determined.

As described above, the matching unit 52 matches the questioner and an answerer according to the result of the processes of the log information analysis unit 53.

[Configuration of DB]

As illustrated in FIG. 6, the DB 54 includes the device performance specification DB 541, the device use stuck DB 542, the advance use DB 543, a bulletin board service (BBS) DB 544.

The device performance specification DB 541 is a database in which performance specifications of a device, such as an operation (operational sequence) executable on a device, and performance and a performance state resulting from the operation, are accumulated for each device type. The device performance specification DB 541 accumulates, for example, an operational sequence and performance information for each device. An example of a data structure of performance specifications accumulated in the device performance specification DB 541 is described below.

FIG. 7 shows an example of a data structure of performance specifications stored in the device performance specification DB. The device performance specification DB 541 stores an operational sequence executable for each device type. In Embodiment, the device performance specification DB 541 stores, as performance specifications for each device type, a state identifier 800, an operation identifier 801, a previous state identifier 802, and a next state identifier 803.

The state identifier 800 is an identifier indicating each state of a device. Examples of the state identifier include identifiers indicating a power OFF state (0000), a state in which the power is ON and nothing is inside a device (0001), and a state in which the power is ON and something is inside the device (0002). The operation identifier 801 is an identifier indicating an operation executable on a device. An example of the operation identifier is an identifier indicating pressing the power button (0000). The previous state identifier 802 is an identifier indicating a state immediately before the state indicated by the state identifier. The next state identifier 803 is an identifier indicating a state to be changed when an operation indicated by the operation identifier is performed in a state indicated by the state identifier.

The device use stuck DB 542 is a database which accumulates an operation (stuck operation) assumed as an operation on which a user gets stuck (stuck state), and a performance state of the device. The following describes an example of a data structure of a stuck state accumulated in the device use stuck DB 542.

FIG. 8 shows an example of a data structure of stuck states stored in the device use stuck DB. The device use stuck DB 542 stores, as a stuck state for each device type, (i) a state identifier 900 indicating a state to which a device is likely to be changed when a user gets confused about operations of a device, (ii) an operation identifier 901 indicating an operation which a user is likely to perform when the user gets confused about operations of a device, and (iii) a determination amount 902.

Examples of the state indicated by the state identifier 900 include a state in which "the power is ON, something is inside a device, and an operation button is not being pressed" (0069). Examples of the operation indicated by the operation identifier 901 include operations of pressing a cancel button (0018), and pressing a return button (0019). Moreover, the determination amount 902 is a value indicating a total time elapsed from when a device is changed to the state indicated by the state identifier 900 or indicating a number of times for which the operation indicated by the operation identifier 901 is performed. The content of the device use stuck DB 542 may be registered by a service provider, or may be automatically set according to the result obtained by analyzing values in the data center of the data center operating company.

The advance use DB 543 is a database in which advanced operations performed on a device by a user who makes full use of the device are accumulated. The following describes an example of a data structure indicating advanced operations accumulated in the advance use DB 543.

FIG. 9 shows an example of data indicating an advanced operation stored in the advance use DB. The advance use DB 543 stores, for each device type, a state identifier 1000 indicating a state to which a device is likely to be changed by a user who makes full use of the device, an operation identifier 1001 which indicates an operation that is likely to be performed by a user who makes full use of the device, and a determination amount 1002. Examples of the states indicated by the state identifier 1000 include a state in which "the power is ON, something is inside a device, and a manual setting is made" (0867). Examples of the operations indicated by the operation identifier 1001 include pressing a manual setting button (0078) and pressing a timer setting button (0079). Moreover, the determination amount 1002 is a value indicating a total time elapsed from when a device is changed to the state indicated by the state identifier 1000, or indicating a number of times for which the operation indicated by the operation identifier 1001 is performed. The content of the advance use DB 543 may be registered by a service provider, or automatically set according to the result obtained by analyzing values in the data center of the data center operating company.

The BBS DB 544 is a database which stores information on a user of a device and the device used by the user. In Embodiment, the BBS DB 544 stores content of questions and answers or the like in addition to information on a user of a device and the device used by the user, and this information is displayed on a bulletin board service (BBS) or the like. The following describes an example of a data structure indicating advanced operations accumulated in the advance use DB 543.

FIG. 10A and FIG. 10B each show an example of data stored in the BBS DB.

The BBS DB 544 stores, as shown in FIG. 10A, a question group 1100, a question ID 1101, a questioner ID 1102, question date and time 1103, and a question text 1104. Furthermore, the BBS DB 544 stores, as shown in FIG. 10B, an answer ID 1106, an answerer ID 1107, answer date and time 1108, and an answer text 1109.

Under the item of the question group 1100, a question type of a user is indicated. A unique identifier of a question from a user is indicated under the item of the question ID 1101, and a unique identifier of a questioner is indicated under the item of the questioner ID 1102. Date and time at which a question is asked is indicated under the item of the question date and time 1103, and content of a question is indicated under the item of the question text 1104. A unique identifier of an answer is indicated under the item of the answer ID 1106; a unique identifier of an answerer is indicated under the item of the answerer ID 1107; date and time at which an answer is given is indicated under the item of the answer date and time 1108; and content of an answer is indicated under the item of the answer text 1109.

[Performances of Matching System]

Next, processes of the matching system 1 structured as described above are described.

Figure 11:
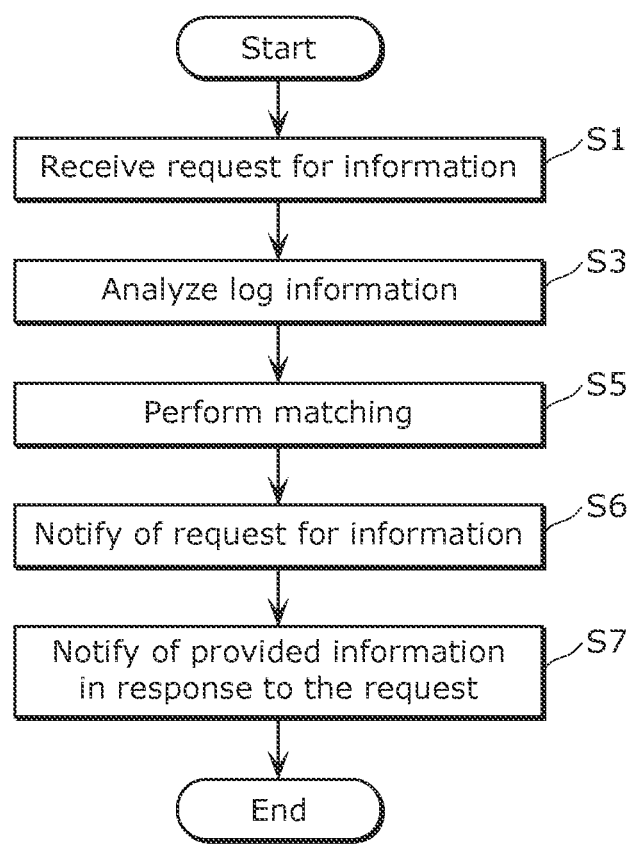
FIG. 11 is a flowchart showing an outline of processes of the matching system according to Embodiment.

FIG. 11 is a flowchart showing an outline of processes of the matching system according to Embodiment.

Assume that the matching system 1 accumulates log information indicating histories of operations performed on devices by users.

In this case, first, the matching system 1 receives a request for information regarding use of a first device (device 61) from an information requester who is one of the users and uses the first device (device 61) (S1).

Next, the matching system 1 analyzes the log information of the first device (device 61) from among the log information accumulated in S1 (S3).

Next, the matching system 1 performs matching (S5). In other words, the matching system 1 identifies, as an information provider candidate, a user who uses the second device (device 62) which is a device of the same type as the first device (device 61) by using the log information of the first device (device 61) analyzed in S3.

Next, the matching system 1 notifies an information provider candidate of the above request from the information requester (S6).

Next, the matching system 1 notifies the information requester of provided information which is information regarding use of the first device (device 61) and provided by the information provider candidate in response to the above request (S7).

Figure 12A:
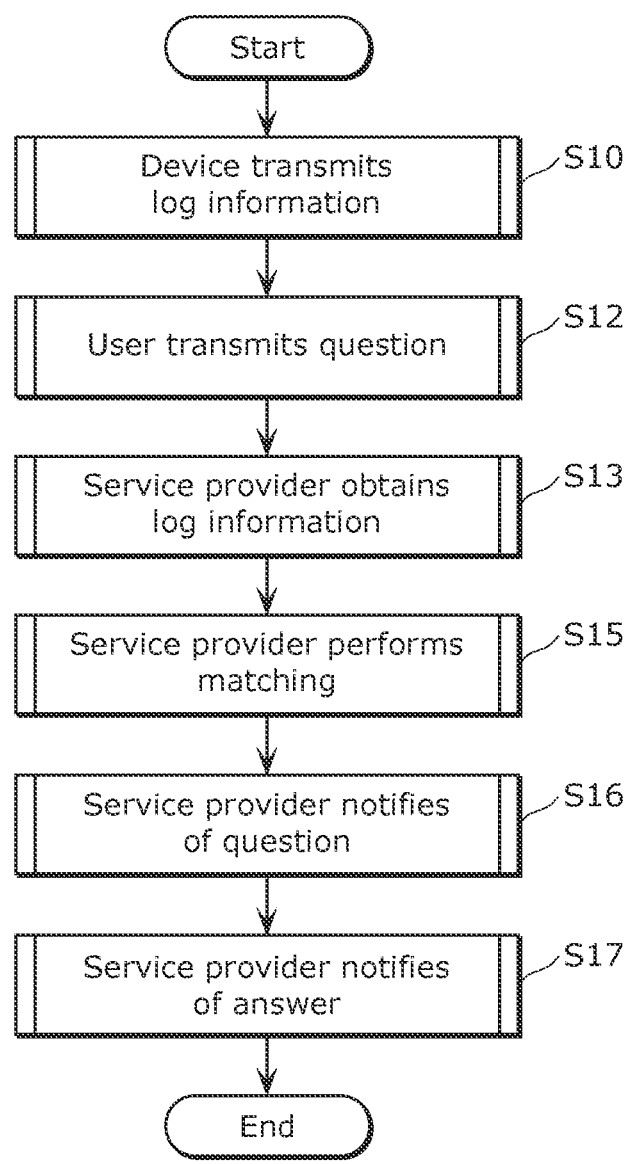
FIG. 12A is a flowchart showing an example of processes of the matching system according to Embodiment.
Figure 12B:
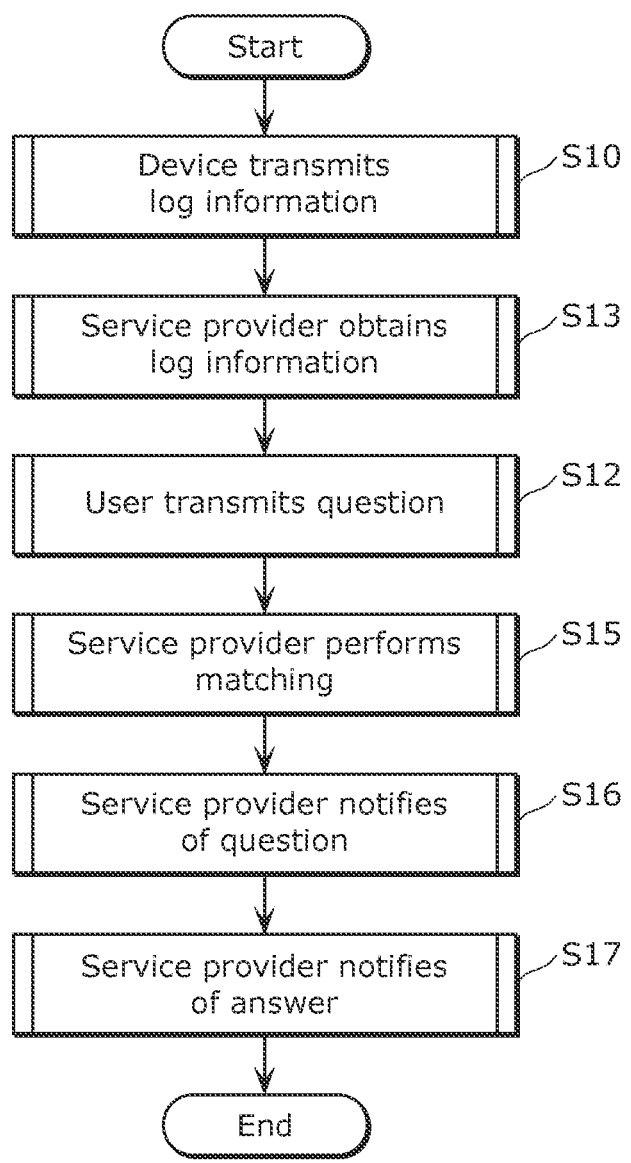
FIG. 12B is a flowchart showing another example of processes of the matching system according to Embodiment.

FIG. 12A is a flowchart showing an example of processes of the matching system according to Embodiment. FIG. 12B is a flowchart showing another example of processes of the matching system according to Embodiment. FIG. 12B differs from FIG. 12A in that the process of S13 is performed before the process of S12 in FIG. 12A is performed. Other than that, FIG. 12B and FIG. 12A are the same. The following describes, with reference to FIG. 12A, performances of the service provider 50, the device 61, and the device 62 that are included in the matching system 1 according to Embodiment.

Figure 13:
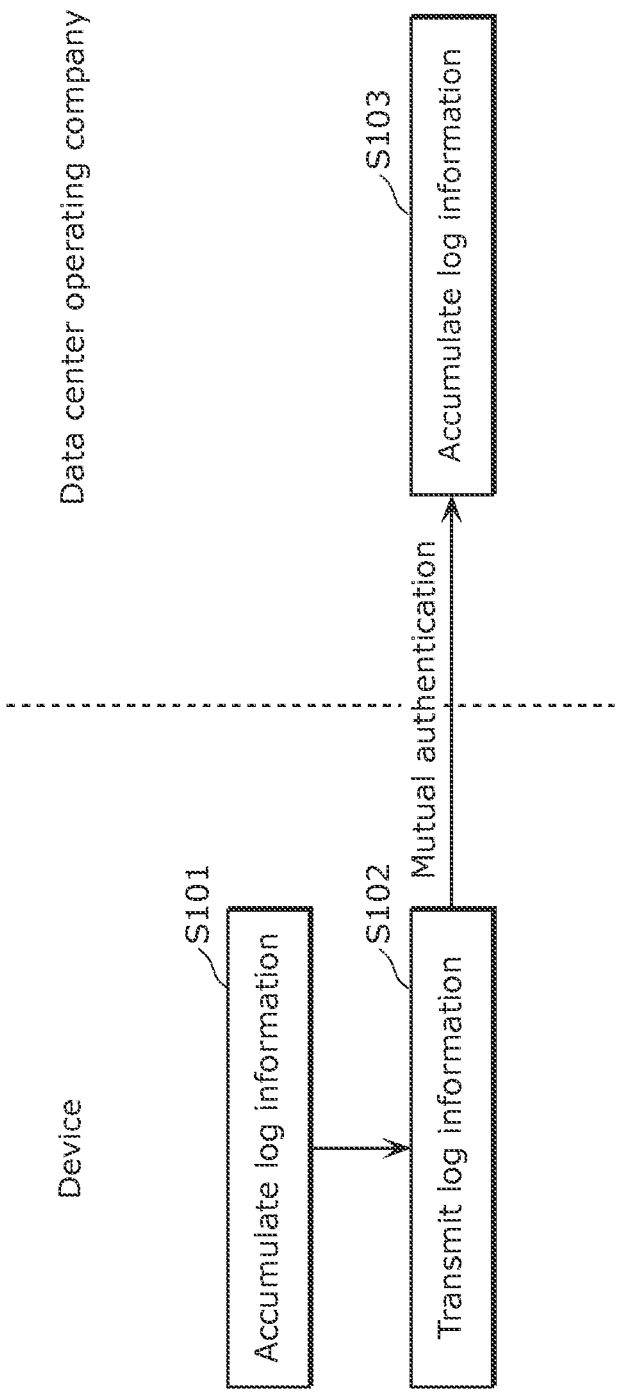
FIG. 13 is a flowchart showing details of S10 according to Embodiment.

First, in S10 in FIG. 12A, the device 61 transmits log information to the cloud server 111 of the data center operating company 110. The following describes details of S10. FIG. 13 is a flowchart showing details of S10.

In S101 in FIG. 13, the device 61 accumulates the log information obtained by the log information obtaining unit 611 in the log information accumulation unit 612. For example, the log information obtaining unit 611 may obtain the operational log information each time a user operates the device 61, and accumulate the obtained operational log information in the log information accumulation unit 612. Moreover, the log information obtaining unit 611 may obtain the state log information at predetermined time intervals, or obtain the state log information when a specific operation is performed. The obtained state log information is accumulated in the log information accumulation unit 612 as with the operational log information. When the log information obtaining unit 611 accumulates new log information in the log information accumulation unit 612, the transmitted flag 703 of the new log information is set to "0" which indicates that the new log information is not transmitted.

Next, in S102, the device 61 (communication unit 614) transmits the log information of the device 61 accumulated in the log information accumulation unit 612 to the cloud server 111 of the data center operating company 110.

Here, first, when the device 61 transmits the log information, the cloud server 111 performs mutual authentication with the device 61. It should be noted that user authentication may be performed in addition to the mutual authentication. The following are reasons for performing authentication. The authentication is to prevent leakage of the log information item of the device 61 to an unintended server on the Internet. Moreover, it is to prevent unintended log information to be accumulated in the cloud server 111 of the data center operating company 110 when an unintended device is connected to the cloud server 111 of the data center operating company 110. A public key infrastructure (PKI) is generally used for the mutual authentication, but any method may be used, provided that an equivalent function is included.

Next, when the mutual authentication between the device 61 and the cloud server 111 is successful, the device ID of the device 61 stored in the device ID management unit 610 and the log information accumulated in the log information accumulation unit 612 are transmitted to the cloud server 111 through the communication unit 614.

Next, when the transmission to the cloud server 111 is successful, the log information accumulation unit 612 rewrites the transmitted flag included in the log information to "1," which indicates that the information is transmitted. It should be noted that the transmitted flag may be deleted to indicate that the log information is transmitted to the cloud server 111. This is because the storage area can be used efficiently. Moreover, the log information to be transmitted to the cloud server 111 by the device 61 is not required to be the information accumulated in the log information accumulation unit 612. Part of the information accumulated in the log information accumulation unit 612 may be transmitted, or the log information obtained by the log information obtaining unit may be directly transmitted without being accumulated in the log information accumulation unit 612.

Next, in S103, the cloud server 111 receives the device ID and the log information, and then accumulates the log information for each device by using the device ID. The following description is given with reference to FIG. 12A again.

Figure 14:
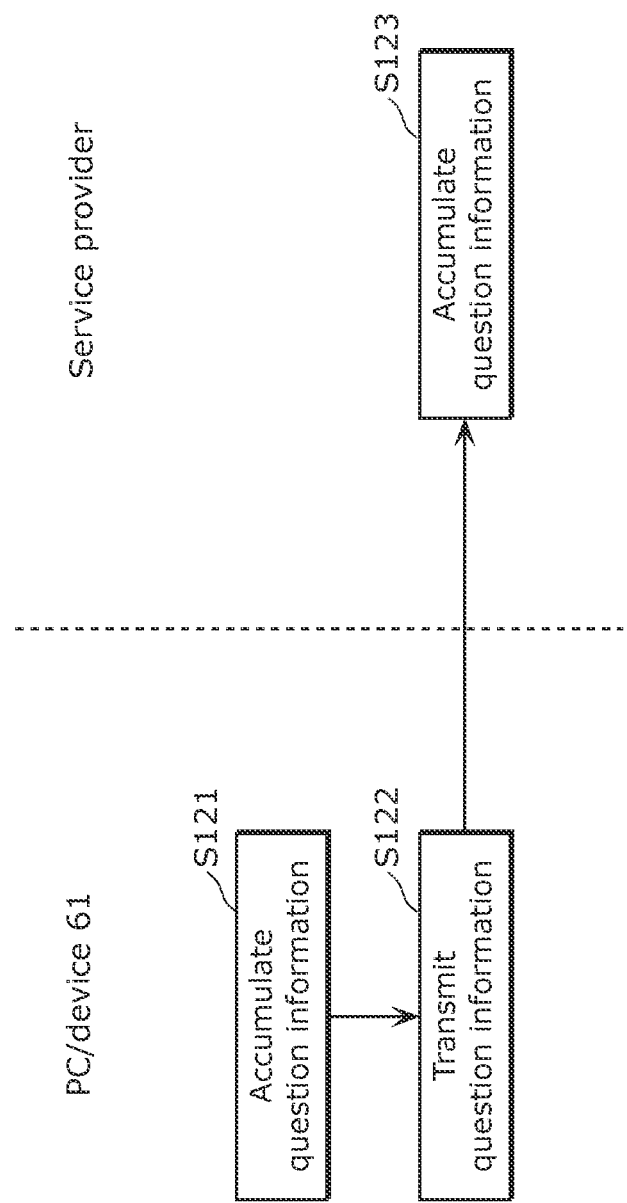
FIG. 14 is a flowchart showing details of S12 according to Embodiment.

Next, in S12 in FIG. 12A, the user of the device 61 transmits a question to the service provider 50 through the device 61. The following describes details of S12. FIG. 14 is a flowchart showing details of S12. It should be noted that S12 is a specific example of S1 described previously.

In S121 in FIG. 14, the user of the device 61 prepares a question regarding the device 61 (a request for information regarding use of the device). Here, the user may input a question directly to the device 61, or prepare a question using a personal computer (PC) (not illustrated) of the user, the PC being associated with the device 61 beforehand. When a PC is used to prepare a question, the device 61 and the PC may be associated by using a device registration service provided by the service provider 50, for example. In this case, for example, first, the user accesses the service provided by the service provider 50 using the PC, and performs user registration. After that, the user registers the device by using a registration device ID displayed on the display of the device 61, or using a registration device ID included in a warranty or the like of the device 61. In this way, the device 61 and the user are associated with each other. The association information between the device 61 and the user is transmitted to the cloud server 111 of the data center operating company 110 from the service provider 50, and the association information between the device 61 and the user is managed in the cloud server 111. This makes it possible to conduct a search in the cloud server 111 by the user ID of the user.

Figure 15:
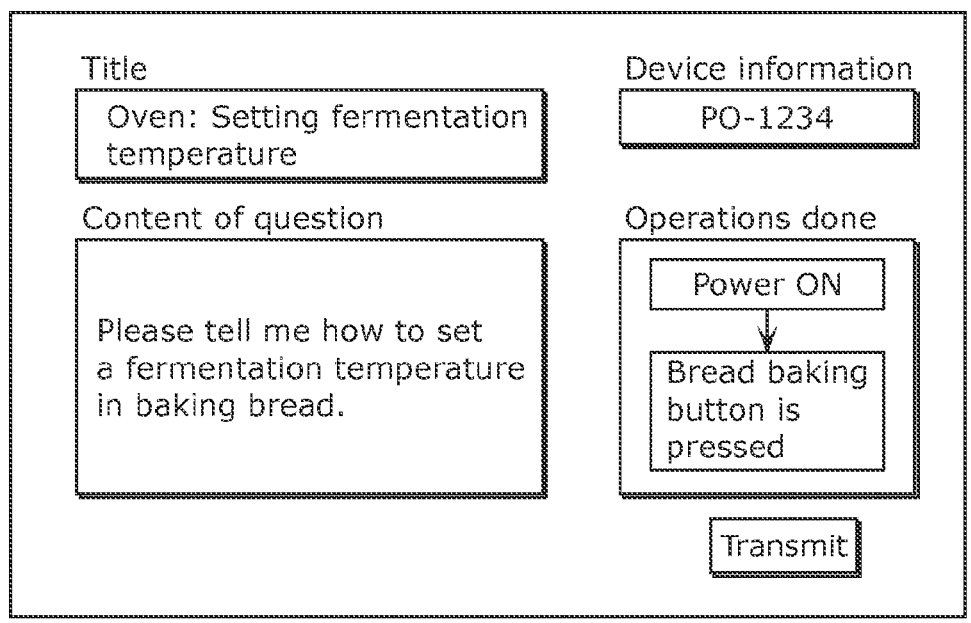
FIG. 15 is an example of a display screen displaying content of a question according to Embodiment.

An example of a display screen displaying content of a question prepared by a user using a PC or the like is described, FIG. 15 is an example of a display screen displaying content of a question input to ask about setting a fermentation temperature in the case of baking bread with an oven. FIG. 15 illustrates a question preparation screen that includes items to be included in a question so that a question can be prepared easily. The question preparation screen includes a title of a question and content of the question. The device information is automatically entered by selecting the device registered by the user him/herself from a list of devices. As support information for an answerer of the question, recent operations performed by the user on the device asked in the question may be visually displayed. The information on the recent operations may be obtained by the service provider 50 through searching the cloud server 111 of the data center operating company 110 by the device ID of the user's device. It should be noted that, instead of a PC, a cellular phone, a smartphone, a tablet, or the like may be used. Moreover, the aforementioned question preparation screen may be provided to the device 61 from the device use support unit 512 via a network, or the device 61 may have a function corresponding to the function of the device use support unit 512 and display such a question preparation screen.

It should be noted that a user may prepare a question without using a PC. For example, assume that a user is confused about the operations of the device 61 in operating the device 61. In this case, the user may press a question button of the device 61 or a predetermined button at the time when the user gets confused about the operations. In this way, the question from the user may be guessed from the operations performed before the user presses the button. There may be the case that the operation pattern of the device 61 cannot be narrowed down at the time when the user presses the button. In this case, the device 61 may display a guide for the user, thereby prompting the user to continue the operation further and narrow down the operation to be asked in the question. Furthermore, the user may use a speech-input device to input a question.

Next, in S122, when the user finishes preparing the question, the user transmits the prepared question (question information) to the service provider 50. In the example of the question preparation screen illustrated in FIG. 15, pressing the transmit button allows the question to be transmitted from the device 61 to the service provider 50. Moreover, when a question is transmitted directly from the device 61, the question information input by using the input/output unit 613 is transmitted to the service provider 50 via the communication unit 614.

Next, in S123, when the service provider 50 receives the question information of the user, the service provider 50 accumulates the question information in the BBS DB 544. In S123, no information is accumulated in the following fields regarding the answer of the BBS DB 544: the answer ID 1106, the answerer ID 1107, the answer date and time 1108, and the answer text 1109. The following description is given with reference to FIG. 12A again.

Figure 16:
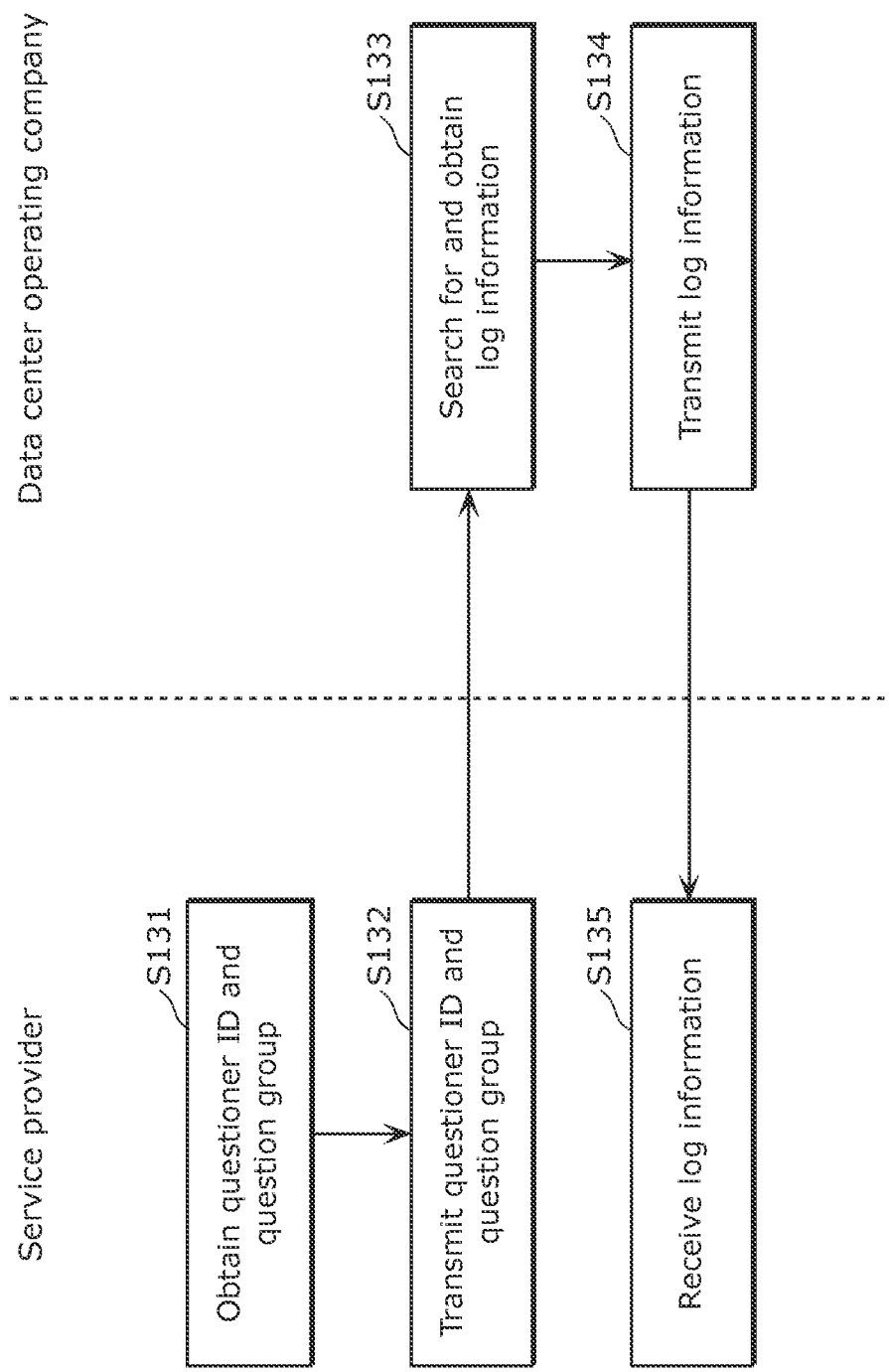
FIG. 16 is a flowchart showing details of S13 according to Embodiment.

Next, in S13 in FIG. 12A, the service provider 50 obtains log information with respect to the device asked in the question received in S12 from the cloud server 111 of the data center operating company 110. The following describes details of S13. FIG. 16 is a flowchart showing details of S13. It should be noted that S13 is a process included in S3 mentioned above.

In S131 in FIG. 16, first, the service provider 50 obtains a questioner ID and a question group of the question from the BBS DB 544 to obtain log information of the questioner.

Next, in S132, the service provider 50 transmits the questioner ID and the question group that are obtained in S131 to the cloud server 111.

Next, in S133, the cloud server 111 uses the questioner ID and the question group received in S131 to search for and obtain log information of the device including the questioner ID that corresponds to the user and the question group that corresponds to the device.

Next, in S134, the cloud server 111 transmits the log information obtained in S133 to the service provider 50.

Next, in S135, the service provider 50 receives the log information from the cloud server 111. In this way, the log information with respect to the device 61 of the questioner can be obtained. The following description is given with reference to FIG. 12A again.

Figure 17:
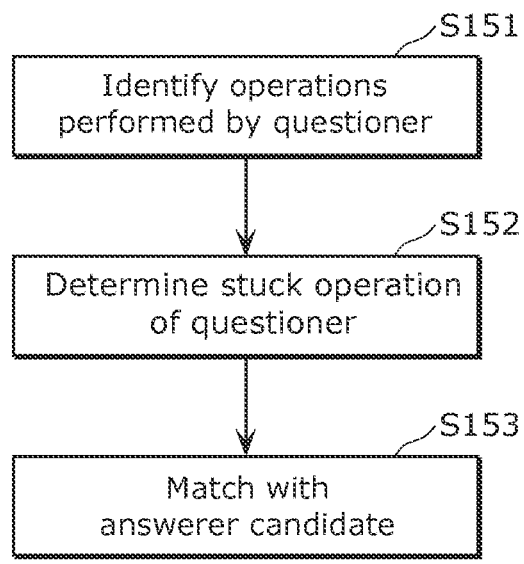
FIG. 17 is a flowchart showing details of S15 according to Embodiment.

Next, in S15 in FIG. 12A, the service provider 50 matches the questioner and an answerer candidate (information provider) by using the question received from the user of the device 61 in S12 and the log information obtained in S13. The following describes details of S15. FIG. 17 is a flowchart showing details of S15.

In S151 in FIG. 17, in the service provider 50, the log information analysis unit 53 analyzes the log information obtained from the cloud server 111 in S135, and identifies the operations performed by the questioner. Information accumulated in the device performance specification DB 541 is used to identify the operations performed by the questioner. Specifically, the following processes are performed. First, a sequence of operation identifiers is extracted from the log information obtained from the cloud server 111. Next, the extracted sequence of operation identifiers is checked against the data in the device performance specification DB 541 to identify the operations performed by the questioner. In other words, the operations performed by the questioner are identified by sequentially searching for the extracted sequence of operation identifiers in the device performance specification DB 541 from the leading operation identifier and following the next state identifiers.

Next, in S152, in the service provider 50, the stuck determination unit 522 determines a stuck state, that is, an operation that causes the stuck state (also referred to as a stuck operation) from among the operations performed by the questioner and identified in S151. Specifically, the following processes are performed. It is determined whether an operation identifier included in the device use stuck DB 542 is included in the operations performed by the questioner. When the operation identifier is included, it is determined whether the included operation identifier is greater than or equal to the determination amount stored in the device use stuck DB 542. When the operation identifier included in the device use stuck DB 542 is greater than or equal to the determination amount, the operation corresponding to the operation identifier is stored as a stuck operation of the questioner. Similarly, it is determined whether a state identifier included in the device use stuck DB 542 is included in the states to be changed by the operations performed by the questioner. When the state identifier is included, it is determined whether the included state identifier is greater than or equal to the determination amount stored in the device use stuck DB 542. When the state identifier included in the device use stuck DB 542 is greater than or equal to the determination amount, the operation corresponding to the state identifier is also stored as a stuck operation of the questioner.

Next, in S153, in the service provider 50, a matching execution unit 521 matches the questioner with an appropriate answerer candidate (information provider candidate) according to the stuck operation of the questioner identified in S152. Specifically, the following processes are performed. First, the matching execution unit 521 searches the device performance specification DB 541, and obtains a list of the operations allowed after the stuck operation of the questioner (list of next operations). Next, the matching execution unit 521 transmits a next operation to the cloud server 111, and obtains a user ID of a user who has performed the next operation from the cloud server 111 of the data center. In other words, a user ID of a user who can perform the next operation that follows after the stuck operation of the questioner is obtained to choose the user as an answerer candidate.

It should be noted that although a stuck operation is used to perform matching, information in the advance use DB 543 may be used to match the questioner with an answerer candidate. Specifically, the following processes may be performed. First, in the service provider 50, the advance determination unit 523 may obtain an operation identifier included in the advance use DB 543 and a determination amount. Next, the obtained operation identifier and the determination amount are transmitted to the cloud server 111 of the data center operating company 110, and a search is performed to find a user who performs an operation corresponding to the transmitted operation identifier for greater than or equal to the determination amount. Furthermore, in a similar manner, a state identifier included in the advance use DB 543 and a determination amount are obtained and the obtained state identifier and the determination amount are transmitted to the cloud server 111 of the data center operating company 110, and a search is performed to find a user who performs an operation corresponding to the transmitted state identifier for greater than or equal to the determination amount. Subsequently, the user found in the search is chosen as an answerer candidate. The following description is given with reference to FIG. 12A again.

Figure 18:
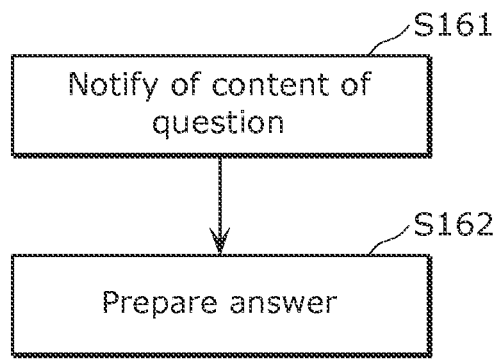
FIG. 18 is a flowchart showing details of S16 according to Embodiment.

In S16 in FIG. 12A, the service provider 50 notifies the answerer candidate (information provider candidate) matched in S15 of the content of the question (information regarding use of the device 61). The following describes details of S16. FIG. 18 is a flowchart showing details of S16.

In S161 in FIG. 18, the service provider 50 notifies all answerer candidates matched in S153 of the content of the question from the questioner. Any method may be used to notify each of the answerer candidates, for example, contacting by e-mail, push notification, visually notifying the answerer candidate when the answerer candidate uses the service, notifying a device used by the answerer candidate, or notifying a mobile terminal such as a smartphone carried by the answerer candidate.

Figure 19:
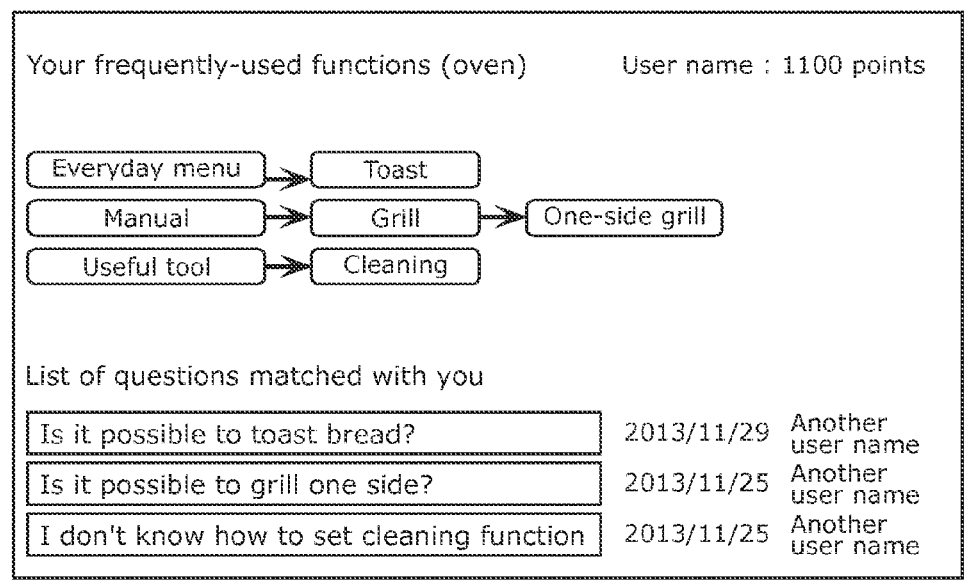
FIG. 19 illustrates an example of a display screen on which reasons that the user is matched with the questioners are shown with content of questions according to Embodiment.
Figure 20:
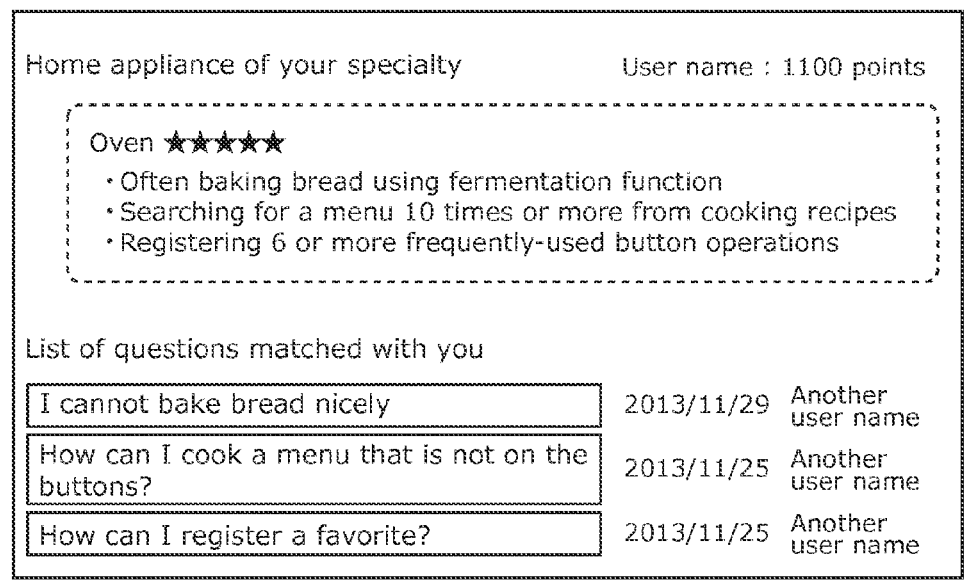
FIG. 20 illustrates an example of a display screen on which reasons that the user is matched with the questioners are shown with content of questions according to Embodiment.

It should be noted that when the content of the question from the questioner is notified to all answerer candidates who have been matched, a reason for the answerer candidates being matched with the questioner may be shown as illustrated in FIG. 19 or FIG. 20, for example. Each of FIG. 19 and FIG. 20 illustrates an example of a display screen on which reasons that the user is matched with the questioners are shown with content of questions.

The display screen illustrated in FIG. 19 shows that the device 61 and the device 62 are ovens and the answerer has been performed the stuck operations of the questioners, and thus the answerer is determined to be capable of preparing an answer to the questions and is matched with the questioners. The display screen illustrated in FIG. 19 shows flows of operations of the device 62 which are frequently used by the answerer, and a list of questions from users who are stuck in the flows of the operations. It can be understood from the display screen that the answerer has been performed the stuck operations of the questioners, and is matched with the questioners because the answerer is determined to be capable of preparing answers to the questions.

The display screen illustrated in FIG. 20 shows that the device 61 and the device 62 are ovens and the answerer has been performed advanced operations related to the stuck operations of the questioners, and thus the answerer is determined to be capable of preparing answers to the questions. The display screen illustrated in FIG. 20 shows advanced operations performed by the answerer and questions related to the advanced operations and the questioners of the questions are listed. It can be understood from the display screen that the answerer has been performed the advanced operations related to the stuck operations, and is matched with the questioners because the answerer is determined to be capable of preparing answers to the questions.

Next, in S162, the user (for example, a user of the device 62) who has been notified from the service provider 50 prepares an answer to a question. This user may input an answer directly to the device 62, or may use the user's PC associated with the device 62 beforehand to prepare an answer.

An example of the display screen displaying the content of the answer prepared for the question using a PC or the like is described, it should be noted that an answer may be prepared by operating the device itself by the user, or may use a screen of another device that is different from the mobile terminal or PC or the like.

Figure 21:
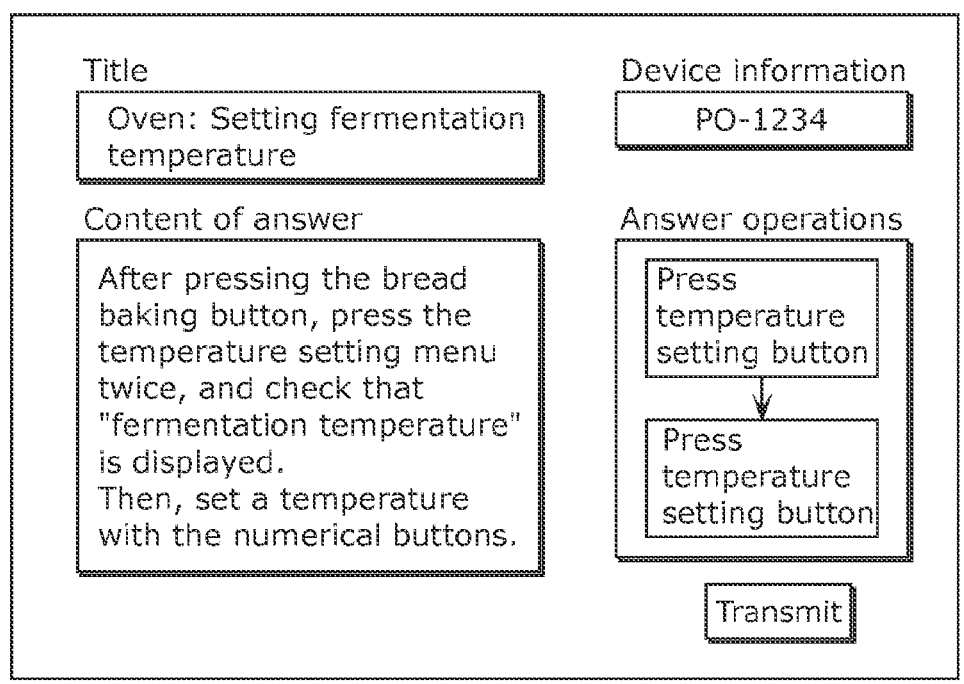
FIG. 21 illustrates an example of a display screen displaying content of an answer according to Embodiment.

FIG. 21 illustrates an example of a display screen displaying content of an answer input for the question regarding setting a fermentation temperature in the case of baking bread with an oven. FIG. 21 illustrates an answer preparation screen including items to be answered so that an answer to the question can be prepared easily. Content of an answer is input to the answer preparation screen. Furthermore, the answer preparation screen may visually display a user's answer operations to be performed on the device asked in the question as support information for the answer to the question. Here, the user is the answerer of the question regarding the device. Furthermore, the answer preparation screen may display a user interface for performing virtual operations and prepare answer operations by the answerer by actually performing the answer operations on the user interface. The information showing the answer operations may be obtained by the service provider 50 through searching the cloud server 111 of the data center operating company 110 by the device ID of the user's device. Instead of a PC, a cellular phone, a smartphone, a tablet, or the like may be used. The following description is given with reference to FIG. 12A again.

Figure 22:
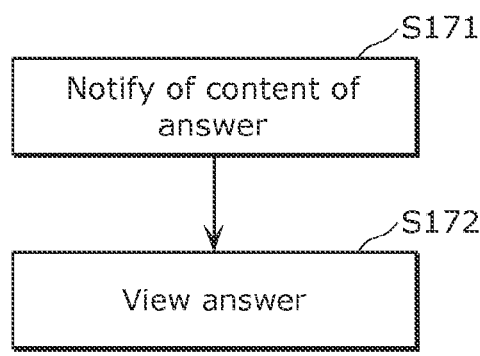
FIG. 22 is a flowchart showing details of S17 according to Embodiment.

Next, in S17 in FIG. 12A, the service provider 50 notifies the questioner who has asked the question in S10 of the answer prepared by the answerer. The following describes details of S17. FIG. 22 is a flowchart showing details of S17.

In S171 in FIG. 22, the service provider 50 notifies the questioner of the answer prepared by the answerer in S162. Any method may be used to notify the questioner, for example, contacting by e-mail, push notification, visually notifying the questioner when the questioner uses the service, and the like.

Next, in S172, the questioner who is notified from the service provider 50 views the answer to the question by using a PC (or directly on the device 61).

(Effects)

According to Embodiment, even a user who is inexperienced in operating a device can obtain appropriate information regarding use of the device from an information provider.

Specifically, according to Embodiment, a user (information requester) who wants operational information of a home appliance as information regarding use of the device is matched with a user (information provider) who wants to provide the operational information of the home appliance, by using log information including operational histories and performance histories of devices, for example, domestic electric appliances such as rice cookers and ovens and AV home appliances such as televisions and recorders.

This enables provision of a question and answer service regarding home appliances. In other words, log information of home appliances is used, and a user who actually uses the home appliance asked in a question from a questioner (information requester) is matched with the questioner as an answerer candidate (information provider candidate). With this, a service that can provide a more appropriate answer to the questioner can be provided. Furthermore, operations performed on a home appliance of the questioner may be analyzed and a stuck point at which the questioner gets stuck in the operations and the state of the stuck operation may be identified to match the questioner with a user as an answerer candidate who actually uses the operations of the device to be performed after the stuck point or state of the stuck operation. In this way, a service that can provide a more appropriate answer to the questioner can be provided.

It should be noted that in Embodiment, an answerer prepares an answer, but this is a non-limiting example. For example, in addition to preparing the answer by the answerer, a sequence of the operation identifiers (setting information) which actually causes the answer operations may be transmitted to the questioner. With this, the questioner does not need to make a setting by viewing the answer and the setting for the device can be made automatically using the received operation identifiers (setting information).

The foregoing has described a matching method according to one or more aspects of the present invention based on Embodiment, but the present invention is not limited to Embodiment above. Various modifications to the embodiment that may be conceived by those skilled in the art and combinations of structural components in different embodiments may be included within the scope of the one or more aspects of the present invention, as long as the modifications and combinations do not depart from the spirit of the present invention.

It should be noted that, in S121 in Embodiment above, an example of display screen displaying content of a question prepared by a user is described with reference to FIG. 15, but this is a non-limiting example. For example, the display screen may further include a visual display of recent operations. Furthermore, a person who can display (view) such a display screen may be limited to protect privacy.

It is described that in S121, the user of the device 61 prepares a question about the device 61 (request for information regarding use of the device), but the aspect of preparation is not limited to the example described above. For example, the user may press a predetermined key such as a help button when the user gets confused about the operations. In this case, if frequently asked questions and answers are displayed as FAQ or the like, the user may obtain an answer when the operation that the user wants to know about is included in the FAQ. Furthermore, in addition to the user pressing the predetermined key such as a help button when the user gets confused about the operations, a guide may be used to prompt the user to continue the operation to narrow down the question, or the user may input the question with his/her voice, that is, using speech input.

Furthermore, in S151 and the like in Embodiment, it is described that the device performance specification DB 541 that accumulates operational sequences and performance information is used to identify operations performed by the questioner and the answerer candidate, but this is a non-limiting example. Operations of the questioner and the answerer may be identified using only the log information.

Furthermore, in S152, it is described the device use stuck DB 542 that accumulates stuck operations and performance states of a device is used to identify the stuck operation of the questioner, but this is a non-limiting example, instead of identifying the stuck operation, an operation performed immediately before the user prepares the question and setting information included in the log information may be displayed because a stuck operation can be identified by the displaying.

It should be noted that whether or not an advanced operation is performed on the device 62 is determined in Embodiment, but this is a non-limiting example. For example, a user who uses an advanced operation, that is, who makes full use of a device, may be determined using a registration system, or a user who is an employee of a device manufacturer may be determined as a user who makes full use of the device.

The technique in the above-described aspects may be implemented in, for example, the following types of cloud services, it should be noted that these types of cloud services in which the technique in the above-described aspects are implemented are non-limiting examples.

(Service Type 1: Own Data Center Type)

Figure 23:
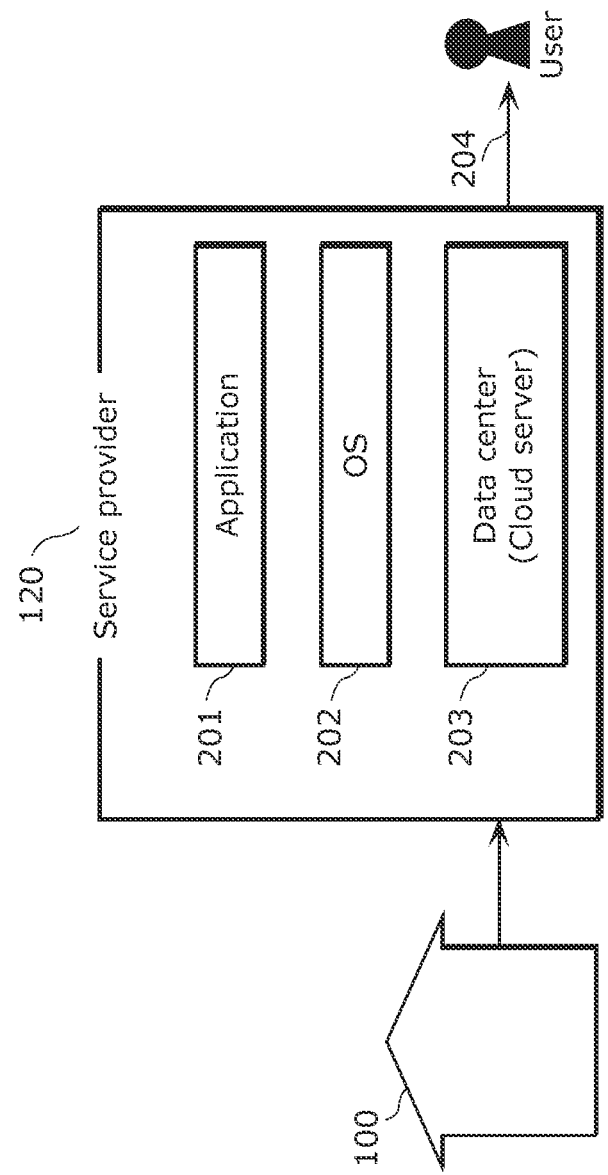
FIG. 23 illustrates an example of a service type (own data center type).

FIG. 23 illustrates a service type 1 (own data center type).

In this type, the service provider 120 obtains information from the group 100 and provides a service to users. The service provider 120 in this type serves a function similar to the function of a data center operating company. In other words, the service provider 120 has the cloud server 111 to manage big data. Thus, in this type, there is no actual data center operating company.

In this type, the service provider 120 operates and manages a data center 203 (cloud server 111). Furthermore, the service provider 120 manages an operating system (OS) 202 and an application 201. The service provider 120 provides a service using the OS 202 and the application 201 managed by the service provider 120 itself.

(Service Type 2: IaaS-Based Type)

Figure 24:
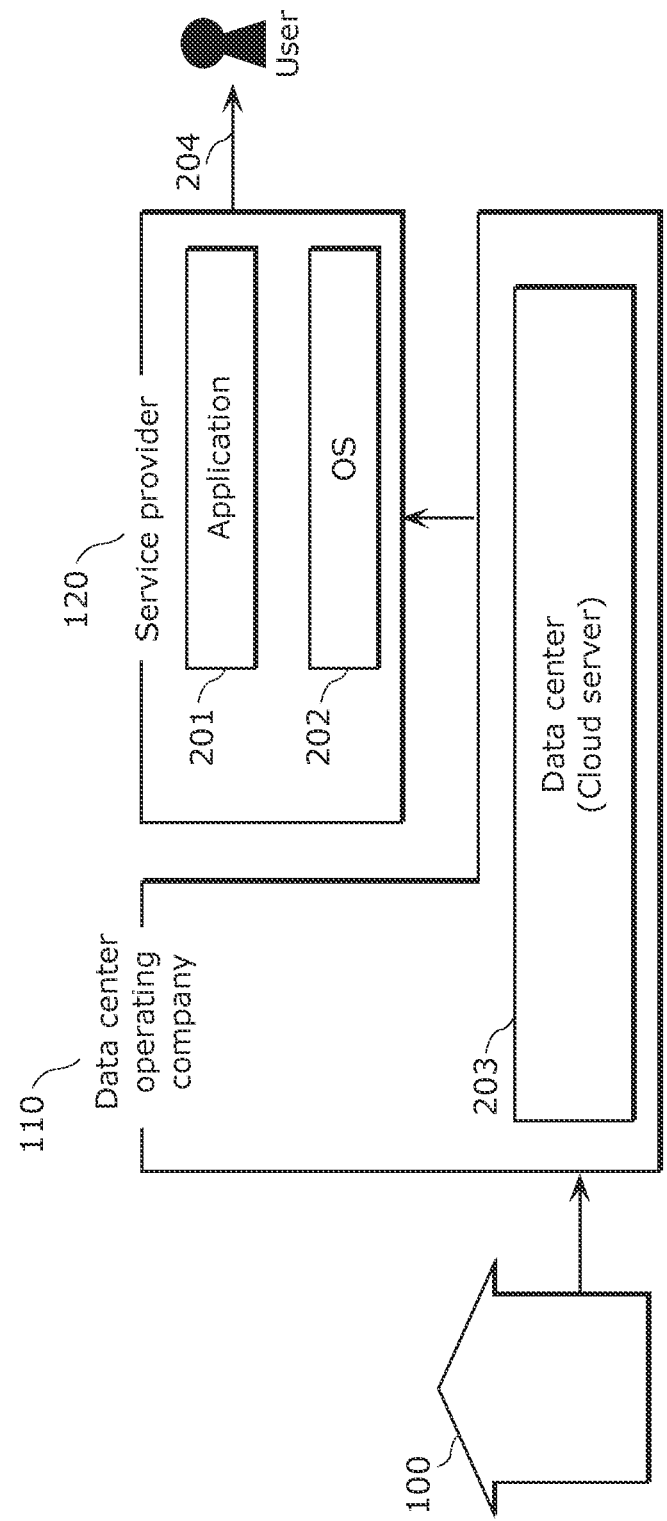
FIG. 24 illustrates an example of the service type (Infrastructure as a Service (IaaS)-based type).

FIG. 24 illustrates a service type 2 (Infrastructure as a Service (IaaS)-based type).

The term IaaS stands for Infrastructure as a Service which refers to a type of a cloud service in which infrastructure for building and running a computer system is provided as a service via the Internet.

In this type, a data center operating company operates and manages the data center 203 (cloud server 111). Furthermore, the service provider 120 manages the OS 202 and the application 201. The service provider 120 provides a service to a user indicated by an arrow 204 using the OS 202 and the application 201 managed by the service provider 120 itself.

(Service Type 3: PaaS-Based Type)

Figure 25:
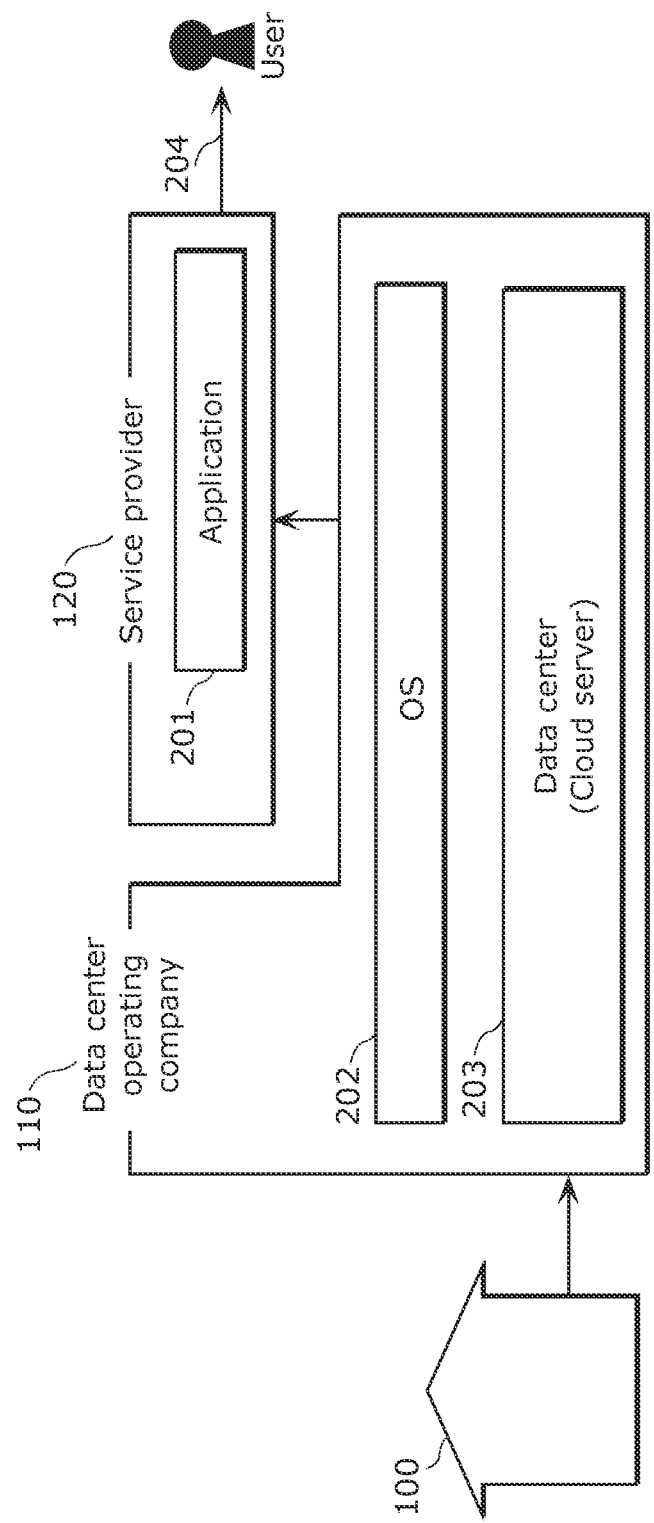
FIG. 25 illustrates an example of the service type (Platform as a Service (PaaS)-based type).

FIG. 25 illustrates a service type 3 (Platform as a Service (PaaS)-based type). The term PaaS stands for Platform as a Service which refers to a type of a cloud service in which a platform for composing and running software is provided as a service via the Internet.

In this type, the data center operating company 110 manages the OS 202 and operates and manages the data center 203 (cloud server 111). Furthermore, the service provider 120 manages the application 201. The service provider 120 provides a service to a user indicated by the arrow 204 using the OS 202 managed by the data center operating company and the application 201 managed by the service provider 120 itself.

(Service Type 4: SaaS-Based Type)

Figure 26:
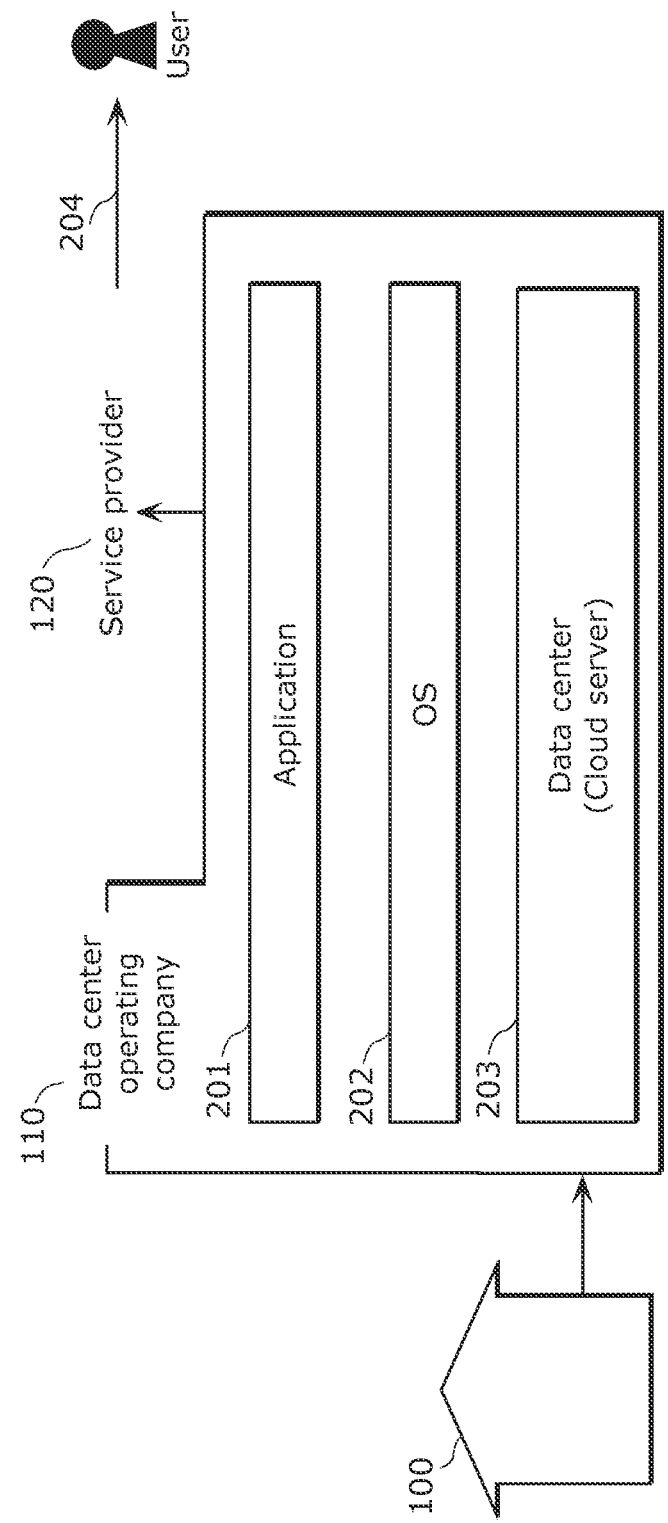
FIG. 26 illustrates a service type (Software as a Service (SaaS)-based type) according to Embodiment of the present invention.

FIG. 26 illustrates a service type 4 (Software as a Service (SaaS)-based type).

The term SaaS stands for Software as a Service. For example, SaaS refers to a type of cloud service in which a company or a person (user) not having a data center (cloud server) is provided access to an application via a network such as the Internet by a platform provider having a data center (cloud server).

In this type, the data center operating company 110 manages the application 201 and the OS 202 and operates and manages the data center 203 (cloud server 111). The service provider 120 provides a service to a user indicated by the arrow 204 using the OS 202 and the application 201 managed by the data center operating company.

In any of the above types, the service provider 120 is considered as a provider of the service. For example, the service provider or the data center operating company may develop OS, applications, or big data database and others by itself or may outsource the development to a third party.

INDUSTRIAL APPLICABILITY

A matching system according to an aspect of the present invention is useful as a matching system. The matching system uses information such as operation histories and performance histories of domestic electric appliances and AV home appliances to match a user who wants to obtain operational information of home appliances with a user who wants to provide the operational information of the home appliances.

REFERENCE SIGNS LIST

1 Matching system
10, 20 User
50, 120 Service provider
51, 613 Input/output unit
52 Matching unit
53 Log information analysis unit
54 DB
61, 62, 101 Device
100 Group
102 Home gateway
110 Data center operating company
111 Cloud server
112, 202 OS
121 Server
201 Application
203 Data center
204 Arrow
511 Reception unit
512 Device use support unit
513 Notification unit
521 Matching execution unit
522 Stuck determination unit
523 Advance determination unit
541 Device performance specification DB
542 Device use stuck DB
543 Advance use DB
544 BBS DB
610 Device ID management unit
611 Log information obtaining unit
612 Log information accumulation unit
614 Communication unit

The invention claimed is:

1. A matching method performed by a server connected to devices via a network, the matching method comprising:

accumulating log information in a storage device, the log information indicating histories of operations performed on the devices by users and histories of states changed by the operations performed on the devices by the users;

receiving, by the server, a request for information from a first device of the devices, the request for information regarding how to use at least one operation of the first device from an information requester who is one of the users and uses the first device;

identifying, by the server, a plurality of operations performed on the first device by the information requester and a plurality of states of the first device changed by the plurality of operations by obtaining and analyzing log information of the first device from among the log information accumulated in the accumulating;

identifying, by the server, as an information provider candidate, from among the users who use second devices of the devices, the second devices being of the same type as the first device, at least one user who uses a second device having log information that matches the plurality of operations and the plurality of states that are identified in the identifying of a plurality of operations by comparing the plurality of operations and the plurality of states that are identified in the identifying of a plurality of operations with the log information of the second device;

notifying, by the server, the second device which is used by the information provider candidate, of the request from the information requester by transmitting the request from the information requester together with the plurality of operations and the plurality of states that are identified in the identifying of a plurality of operations; and notifying, by the server, the information requester of provided information by transmitting the provided information to the first device of the information requester, the provided information being information regarding how to use the at least one operation of the first device and provided by the information provider candidate in response to the request, wherein the provided information includes, as information regarding use of the first device, either one of device setting information which is information regarding a setting of the first device and device operational information that includes an operational procedure of the first device.

2. The matching method according to claim 1, wherein in the identifying the at least one user who uses the second device, the log information of the first device analyzed in the analyzing and the log information of the second device are compared to identify the at least one user who uses the second device as the information provider candidate.

3. The matching method according to claim 1, wherein the log information includes (i) operational log information indicating a history of operations performed on the first device by the information requester and (ii) state log information indicating a history of states of the plurality of states of the first device, the states being changed by the operations performed by the information requester.

4. The matching method according to claim 3, wherein in the analyzing, the plurality of operations performed on the first device by the information requester and the plurality of states of the first device changed by the operations are identified by analyzing the operational log information and the state log information of the first device, and in the notifying of the request, the operations and the states identified in the analyzing are notified together with the request from the information requester.

5. The matching method according to claim 3, wherein in the analyzing, a first operation performed on the first device by the information requester and a first state of the first device changed by the first operation are identified by analyzing the operational log information and the state log information of the first device, and in the identifying the at least one user who uses the second device, the log information of the first device analyzed and the log information of the second device are compared to identify, as the information provider candidate, the at least one user who uses the second device, the log information of the second device matching the first operation and the first state identified in the analyzing.

6. The matching method according to claim 3, wherein the identifying a plurality of operations further comprises determining a stuck state in which the user is stuck in the operations of the first device based on the log information of the first device analyzed in the analyzing, in the analyzing, the plurality of operations performed on the first device by the information requester and the plurality of states of the first device changed by the operations are identified by analyzing the operational log information and the state log information of the first device, and the log information of the second device includes (i) a second operation performed in the stuck state determined in the determining of a stuck state, (ii) a state of the first device before the second operation is performed and the state of the first device changed by the second operation, and (iii) an operation performed temporally after the second operation.

7. The matching method according to claim 3, wherein the identifying a plurality of operations further comprises determining whether or not an advanced operation is performed on the second device based on the log information of the first device analyzed in the analyzing, in the analyzing, the plurality of operations performed on the first device by the information requester and the plurality of states of the first device changed by the operations are identified by analyzing the operational log information and the state log information of the first device, and in the identifying the at least one user who uses the second device, when the advanced operation determined in the determining of an advanced operation is not included in the operations performed on the first device by the information requester, the at least one user who uses the second device having operational log information that matches the advanced operation determined is identified as the information provider candidate.

8. The matching method according to claim 7,
wherein the advanced operation is an operation performed at a frequency less than or equal to a predetermined frequency among a plurality of operations to be performed on the first device and the second device.

9. The matching method according to claim 7,
wherein the advanced operation is an operation which is to be performed on the first device and the second device and that is newly set as an operation other than a plurality of predetermined operations.

10. The matching method according to claim 1,
wherein the provided information includes, as the information regarding use of the first device, the device setting information which is the information regarding the setting of the first device.

11. The matching method according to claim 1,
wherein the provided information includes, as the information regarding use of the first device, the device operational information that includes the operational procedure of the first device.

12. The matching method according to claim 1,
wherein the devices are to be used for housework.

13. A non-transitory computer-readable recording medium for use in a server connected to devices via a network, the non-transitory computer-readable recording medium having a matching program recorded thereon for implementing a service through which information regarding use of the devices is providable and obtainable, the matching program causing the server to execute:

accumulating log information in a storage device, the log information indicating histories of operations performed on the devices by users and histories of states changed by the operations performed on the devices by the users;

receiving, by the server, a request for information from a first device of the devices, the request for information regarding how to use at least one operation of the first device from an information requester who is one of the users and uses the first device;

identifying, by the server, a plurality of operations performed on the first device by the information requester and a plurality of states of the first device changed by the plurality of operations by obtaining and analyzing log information of the first device from among the log information accumulated in the accumulating;

identifying, by the server, as an information provider candidate, from among the users who use second devices of the devices, the second devices being of the same type as the first device, at least one user who uses a second device having log information that matches the plurality of operations and the plurality of states that are identified in the identifying of a plurality of operations by comparing the plurality of operations and the plurality of states that are identified in the identifying of a plurality of operations with log information of the second device;

notifying, by the server, the second device which is used by the information provider candidate, of the request from the information requester by transmitting the request from the information requester together with the plurality of operations and the plurality of states that are identified in the identifying of a plurality of operations; and notifying, by the server, the information requester of provided information by transmitting the provided information to the first device of the information requester, the provided information being information regarding how to use the at least one operation of the first device and provided by the information provider candidate in response to the request, wherein the provided information includes, as information regarding use of the first device, either one of device setting information which is information regarding a setting of the first device and device operational information that includes an operational procedure of the first device.

* * * * *